(12) United States Patent
Newton

(10) Patent No.: US 8,456,447 B2
(45) Date of Patent: Jun. 4, 2013

(54) TOUCH SCREEN SIGNAL PROCESSING

(75) Inventor: John David Newton, Auckland (NZ)

(73) Assignee: Next Holdings Limited (NZ)

( * ) Notice: Subject to any disclaimer, the term of this patent is extended or adjusted under 35 U.S.C. 154(b) by 839 days.

(21) Appl. No.: 12/569,166

(22) Filed: Sep. 29, 2009

(65) Prior Publication Data

US 2010/0085330 A1 Apr. 8, 2010

Related U.S. Application Data

(63) Continuation-in-part of application No. 11/033,183, filed on Jan. 11, 2005, now Pat. No. 7,629,967, which is a continuation of application No. PCT/NZ2004/000029, filed on Feb. 16, 2004.

(30) Foreign Application Priority Data

Feb. 14, 2003 (NZ) ........................ 524211

(51) Int. Cl.
*G06F 3/042* (2006.01)

(52) U.S. Cl.
USPC ........... 345/175; 345/174; 345/173; 349/110; 349/147; 349/129

(58) Field of Classification Search
None
See application file for complete search history.

(56) References Cited

U.S. PATENT DOCUMENTS

| | | | |
|---|---|---|---|
| 844,152 A | 2/1907 | Little | |
| 2,407,680 A | 9/1946 | Palmquist et al. | |
| 2,769,374 A | 11/1956 | Sick | |
| 3,025,406 A | 3/1962 | Stewart et al. | |
| 3,128,340 A | 4/1964 | Harmon | |
| 3,187,185 A | 6/1965 | Milnes | |
| 3,360,654 A | 12/1967 | Muller | |

(Continued)

FOREIGN PATENT DOCUMENTS

| | | |
|---|---|---|
| AU | 7225001 | 1/2002 |
| AU | 2003233728 | 12/2003 |

(Continued)

OTHER PUBLICATIONS

Japanese Patent Application No. 2007-511305, Office Action, mailed Sep. 6, 2011, Office Action—3 pages, English Translation—4 pages.

(Continued)

*Primary Examiner* — Van Chow
(74) *Attorney, Agent, or Firm* — Kilpatrick Townsend & Stockton LLP

(57) ABSTRACT

A coordinate detection system can comprise a display screen, a touch surface corresponding the top of the display screen or a material positioned above the screen and defining a touch area, at least one camera outside the touch area and configured to capture an image of space above the touch surface, an illumination system comprising a light source, the illumination system configured to project light from the light source through the touch surface, and a processor executing program code to identify whether an object interferes with the light from the light source projected through the touch surface based on the image captured by the at least one camera. Light can be directed upward by sources positioned behind the screen, by sources positioned behind the screen that direct light into a backlight assembly that directs the light upward, and/or by a forward optical assembly in front of the screen that directs the light upward.

19 Claims, 19 Drawing Sheets

U.S. PATENT DOCUMENTS

| | | |
|---|---|---|
| 3,478,220 A | 11/1969 | Milroy |
| 3,563,771 A | 2/1971 | Tung |
| 3,613,066 A | 10/1971 | Cooreman |
| 3,764,813 A | 10/1973 | Clement et al. |
| 3,775,560 A | 11/1973 | Ebeling et al. |
| 3,810,804 A | 5/1974 | Rowland |
| 3,830,682 A | 8/1974 | Rowland |
| 3,857,022 A | 12/1974 | Rebane et al. |
| 3,860,754 A | 1/1975 | Johnson et al. |
| 4,107,522 A | 8/1978 | Walter |
| 4,144,449 A | 3/1979 | Funk et al. |
| 4,243,618 A | 1/1981 | Van Arnam |
| 4,243,879 A | 1/1981 | Carroll et al. |
| 4,247,767 A | 1/1981 | O'Brien et al. |
| 4,329,037 A | 5/1982 | Caviness |
| 4,420,261 A | 12/1983 | Barlow et al. |
| 4,459,476 A | 7/1984 | Weissmueller et al. |
| 4,468,694 A | 8/1984 | Edgar |
| 4,486,363 A | 12/1984 | Pricone et al. |
| 4,507,557 A | 3/1985 | Tsikos |
| 4,542,375 A | 9/1985 | Alles et al. |
| 4,550,250 A | 10/1985 | Mueller et al. |
| 4,553,842 A | 11/1985 | Griffin |
| 4,558,313 A | 12/1985 | Garwin et al. |
| 4,601,861 A | 7/1986 | Pricone et al. |
| 4,672,364 A | 6/1987 | Lucas |
| 4,673,918 A | 6/1987 | Adler et al. |
| 4,688,933 A | 8/1987 | Lapeyre |
| 4,703,316 A | 10/1987 | Sherbeck |
| 4,710,760 A | 12/1987 | Kasday |
| 4,737,631 A | 4/1988 | Sasaki et al. |
| 4,742,221 A | 5/1988 | Sasaki et al. |
| 4,746,770 A | 5/1988 | McAvinney |
| 4,762,990 A | 8/1988 | Caswell et al. |
| 4,766,424 A | 8/1988 | Adler et al. |
| 4,782,328 A | 11/1988 | Denlinger |
| 4,811,004 A | 3/1989 | Person et al. |
| 4,818,826 A | 4/1989 | Kimura |
| 4,820,050 A | 4/1989 | Griffin |
| 4,822,145 A | 4/1989 | Staelin |
| 4,831,455 A | 5/1989 | Ishikawa et al. |
| 4,851,664 A | 7/1989 | Rieger |
| 4,868,551 A | 9/1989 | Arditty et al. |
| 4,868,912 A | 9/1989 | Doering |
| 4,888,479 A | 12/1989 | Tamaru |
| 4,893,120 A | 1/1990 | Doering et al. |
| 4,916,308 A | 4/1990 | Meadows |
| 4,928,094 A | 5/1990 | Smith |
| 4,943,806 A | 7/1990 | Masters et al. |
| 4,980,547 A | 12/1990 | Griffin |
| 4,990,901 A | 2/1991 | Beiswenger |
| 5,025,314 A | 6/1991 | Tang et al. |
| 5,025,411 A | 6/1991 | Tallman et al. |
| 5,043,751 A | 8/1991 | Rice |
| 5,097,516 A | 3/1992 | Amir |
| 5,103,085 A | 4/1992 | Zimmerman |
| 5,103,249 A | 4/1992 | Keene |
| 5,105,186 A | 4/1992 | May |
| 5,109,435 A | 4/1992 | Lo et al. |
| 5,130,794 A | 7/1992 | Ritchey |
| 5,140,647 A | 8/1992 | Ise et al. |
| 5,148,015 A | 9/1992 | Dolan |
| 5,162,618 A | 11/1992 | Knowles |
| 5,162,783 A | 11/1992 | Moreno |
| 5,164,714 A | 11/1992 | Wehrer |
| 5,168,531 A | 12/1992 | Sigel |
| 5,177,328 A | 1/1993 | Ito et al. |
| 5,179,369 A | 1/1993 | Person et al. |
| 5,196,835 A | 3/1993 | Blue et al. |
| 5,196,836 A | 3/1993 | Williams |
| 5,200,851 A | 4/1993 | Coderre et al. |
| 5,200,861 A | 4/1993 | Moskovich |
| 5,233,502 A | 8/1993 | Beatty et al. |
| 5,239,152 A | 8/1993 | Caldwell et al. |
| 5,239,373 A | 8/1993 | Tang et al. |
| 5,272,470 A | 12/1993 | Zetts |
| 5,317,140 A * | 5/1994 | Dunthorn ............... 250/221 |
| 5,359,155 A | 10/1994 | Helser |
| 5,374,971 A | 12/1994 | Clapp et al. |
| 5,414,413 A | 5/1995 | Tamaru et al. |
| 5,422,494 A | 6/1995 | West et al. |
| 5,448,263 A | 9/1995 | Martin |
| 5,457,289 A | 10/1995 | Huang et al. |
| 5,483,261 A | 1/1996 | Yasutake |
| 5,483,603 A | 1/1996 | Luke et al. |
| 5,484,966 A | 1/1996 | Segen |
| 5,490,655 A | 2/1996 | Bates |
| 5,502,568 A | 3/1996 | Ogawa et al. |
| 5,525,764 A | 6/1996 | Junkins et al. |
| 5,528,263 A | 6/1996 | Platzker et al. |
| 5,528,290 A | 6/1996 | Saund |
| 5,537,107 A | 7/1996 | Funado |
| 5,541,372 A | 7/1996 | Baller et al. |
| 5,554,828 A | 9/1996 | Primm |
| 5,581,276 A | 12/1996 | Cipolla et al. |
| 5,581,637 A | 12/1996 | Cass et al. |
| 5,591,945 A | 1/1997 | Kent |
| 5,594,469 A | 1/1997 | Freeman et al. |
| 5,594,502 A | 1/1997 | Bito et al. |
| 5,617,312 A | 4/1997 | Iura et al. |
| 5,638,092 A | 6/1997 | Eng et al. |
| 5,670,755 A | 9/1997 | Kwon |
| 5,686,942 A | 11/1997 | Ball |
| 5,698,845 A | 12/1997 | Kodama et al. |
| 5,712,024 A | 1/1998 | Okuzaki et al. |
| 5,729,704 A | 3/1998 | Stone et al. |
| 5,734,375 A | 3/1998 | Knox et al. |
| 5,736,686 A | 4/1998 | Perret, Jr. et al. |
| 5,737,740 A | 4/1998 | Henderson et al. |
| 5,739,479 A | 4/1998 | Davis-Cannon et al. |
| 5,745,116 A | 4/1998 | Pisutha-Arnond |
| 5,764,223 A | 6/1998 | Chang et al. |
| 5,771,039 A | 6/1998 | Ditzik |
| 5,784,054 A | 7/1998 | Armstrong et al. |
| 5,785,439 A | 7/1998 | Bowen |
| 5,786,810 A | 7/1998 | Knox et al. |
| 5,790,910 A | 8/1998 | Haskin |
| 5,801,704 A | 9/1998 | Oohara et al. |
| 5,804,773 A | 9/1998 | Wilson et al. |
| 5,818,421 A | 10/1998 | Ogino et al. |
| 5,818,424 A | 10/1998 | Korth |
| 5,819,201 A | 10/1998 | DeGraaf |
| 5,825,352 A | 10/1998 | Bisset et al. |
| 5,831,602 A | 11/1998 | Sato et al. |
| 5,877,459 A | 3/1999 | Prater |
| 5,909,210 A | 6/1999 | Knox et al. |
| 5,911,004 A | 6/1999 | Ohuchi et al. |
| 5,914,709 A | 6/1999 | Graham et al. |
| 5,920,342 A | 7/1999 | Umeda et al. |
| 5,926,239 A * | 7/1999 | Kumar et al. ............... 349/69 |
| 5,936,615 A | 8/1999 | Waters |
| 5,936,770 A | 8/1999 | Nestegard et al. |
| 5,940,065 A | 8/1999 | Babb et al. |
| 5,943,783 A | 8/1999 | Jackson |
| 5,963,199 A | 10/1999 | Kato et al. |
| 5,982,352 A | 11/1999 | Pryor |
| 5,988,645 A | 11/1999 | Downing |
| 5,990,874 A | 11/1999 | Tsumura et al. |
| 6,002,808 A | 12/1999 | Freeman |
| 6,008,798 A | 12/1999 | Mato, Jr. et al. |
| 6,015,214 A | 1/2000 | Heenan et al. |
| 6,020,878 A | 2/2000 | Robinson |
| 6,031,524 A | 2/2000 | Kunert |
| 6,031,531 A | 2/2000 | Kimble |
| 6,061,177 A | 5/2000 | Fujimoto |
| 6,067,080 A | 5/2000 | Holtzman |
| 6,075,905 A | 6/2000 | Herman et al. |
| 6,076,041 A | 6/2000 | Watanabe |
| 6,091,406 A | 7/2000 | Kambara et al. |
| 6,100,538 A | 8/2000 | Ogawa |
| 6,104,387 A | 8/2000 | Chery et al. |
| 6,118,433 A | 9/2000 | Jenkin et al. |
| 6,122,865 A | 9/2000 | Branc et al. |
| 6,128,003 A | 10/2000 | Smith et al. |
| 6,141,000 A | 10/2000 | Martin |
| 6,147,678 A | 11/2000 | Kumar et al. |
| 6,153,836 A | 11/2000 | Goszyk |

| Patent | Type | Date | Inventors |
|---|---|---|---|
| 6,161,066 | A | 12/2000 | Wright et al. |
| 6,179,426 | B1 | 1/2001 | Rodriguez, Jr. et al. |
| 6,188,388 | B1 | 2/2001 | Arita et al. |
| 6,191,773 | B1 | 2/2001 | Maruno et al. |
| 6,208,329 | B1 | 3/2001 | Ballare |
| 6,208,330 | B1 | 3/2001 | Hasegawa et al. |
| 6,209,266 | B1 | 4/2001 | Branc et al. |
| 6,215,477 | B1 | 4/2001 | Morrison et al. |
| 6,222,175 | B1 | 4/2001 | Krymski |
| 6,226,035 | B1 | 5/2001 | Korein et al. |
| 6,229,529 | B1 | 5/2001 | Yano et al. |
| 6,252,989 | B1 | 6/2001 | Geisler et al. |
| 6,256,033 | B1 | 7/2001 | Nguyen |
| 6,262,718 | B1 | 7/2001 | Findlay et al. |
| 6,285,359 | B1 | 9/2001 | Ogasawara et al. |
| 6,310,610 | B1 | 10/2001 | Beaton et al. |
| 6,320,597 | B1 | 11/2001 | Ieperen |
| 6,323,846 | B1 | 11/2001 | Westerman et al. |
| 6,326,954 | B1 | 12/2001 | Van Ieperen |
| 6,328,270 | B1 | 12/2001 | Elberbaum |
| 6,335,724 | B1 | 1/2002 | Takekawa et al. |
| 6,337,681 | B1 | 1/2002 | Martin |
| 6,339,748 | B1 | 1/2002 | Hiramatsu |
| 6,346,966 | B1 | 2/2002 | Toh |
| 6,352,351 | B1 | 3/2002 | Ogasahara et al. |
| 6,353,434 | B1 | 3/2002 | Akebi et al. |
| 6,359,612 | B1 | 3/2002 | Peter et al. |
| 6,362,468 | B1 | 3/2002 | Murakami et al. |
| 6,377,228 | B1 | 4/2002 | Jenkin et al. |
| 6,384,743 | B1 | 5/2002 | Vanderheiden |
| 6,406,758 | B1 | 6/2002 | Bottari et al. |
| 6,414,671 | B1 | 7/2002 | Gillespie et al. |
| 6,414,673 | B1 | 7/2002 | Wood et al. |
| 6,421,042 | B1 | 7/2002 | Omura et al. |
| 6,427,389 | B1 | 8/2002 | Branc et al. |
| 6,429,856 | B1 | 8/2002 | Omura et al. |
| 6,429,857 | B1 | 8/2002 | Masters et al. |
| 6,480,187 | B1 | 11/2002 | Sano et al. |
| 6,496,122 | B2 | 12/2002 | Sampsell |
| 6,497,608 | B2 | 12/2002 | Ho et al. |
| 6,498,602 | B1 | 12/2002 | Ogawa |
| 6,501,461 | B2 | 12/2002 | Holtzman |
| 6,504,532 | B1 | 1/2003 | Ogasahara et al. |
| 6,507,339 | B1 | 1/2003 | Tanaka |
| 6,512,838 | B1 | 1/2003 | Rafii et al. |
| 6,517,266 | B2 | 2/2003 | Saund |
| 6,518,600 | B1 | 2/2003 | Shaddock |
| 6,518,960 | B2 | 2/2003 | Omura et al. |
| 6,522,830 | B2 | 2/2003 | Yamagami |
| 6,529,189 | B1 | 3/2003 | Colgan et al. |
| 6,530,664 | B2 | 3/2003 | Vanderwerf et al. |
| 6,531,999 | B1 | 3/2003 | Trajkovic |
| 6,532,006 | B1 | 3/2003 | Takekawa et al. |
| 6,537,673 | B2 | 3/2003 | Sada et al. |
| 6,540,366 | B2 | 4/2003 | Keenan et al. |
| 6,540,679 | B2 | 4/2003 | Slayton et al. |
| 6,545,669 | B1 | 4/2003 | Kinawi et al. |
| 6,559,813 | B1 | 5/2003 | DeLuca et al. |
| 6,563,491 | B1 | 5/2003 | Omura |
| 6,567,078 | B2 | 5/2003 | Ogawa |
| 6,567,121 | B1 | 5/2003 | Kuno |
| 6,570,103 | B1 | 5/2003 | Saka et al. |
| 6,570,612 | B1 | 5/2003 | Saund et al. |
| 6,577,299 | B1 | 6/2003 | Schiller et al. |
| 6,587,099 | B2 | 7/2003 | Takekawa |
| 6,590,568 | B1 | 7/2003 | Astala et al. |
| 6,594,023 | B1 | 7/2003 | Omura et al. |
| 6,597,348 | B1 | 7/2003 | Yamazaki et al. |
| 6,597,508 | B2 | 7/2003 | Seino et al. |
| 6,603,867 | B1 | 8/2003 | Sugino et al. |
| 6,608,619 | B2 | 8/2003 | Omura et al. |
| 6,614,422 | B1 | 9/2003 | Rafii et al. |
| 6,624,833 | B1 | 9/2003 | Kumar et al. |
| 6,626,718 | B2 | 9/2003 | Hiroki |
| 6,630,922 | B2 | 10/2003 | Fishkin et al. |
| 6,633,328 | B1 | 10/2003 | Byrd et al. |
| 6,650,318 | B1 | 11/2003 | Arnon |
| 6,650,822 | B1 | 11/2003 | Zhou |
| 6,664,952 | B2 | 12/2003 | Iwamoto et al. |
| 6,670,985 | B2 | 12/2003 | Karube et al. |
| 6,674,424 | B1 | 1/2004 | Fujioka |
| 6,683,584 | B2 | 1/2004 | Ronzani et al. |
| 6,690,357 | B1 | 2/2004 | Dunton et al. |
| 6,690,363 | B2 | 2/2004 | Newton |
| 6,690,397 | B1 | 2/2004 | Daignault, Jr. |
| 6,710,770 | B2 | 3/2004 | Tomasi et al. |
| 6,714,311 | B2 | 3/2004 | Hashimoto |
| 6,720,949 | B1 | 4/2004 | Pryor et al. |
| 6,727,885 | B1 | 4/2004 | Ishino et al. |
| 6,736,321 | B2 | 5/2004 | Tsikos et al. |
| 6,738,051 | B2 | 5/2004 | Boyd et al. |
| 6,741,250 | B1 | 5/2004 | Furlan et al. |
| 6,741,267 | B1 | 5/2004 | Leperen |
| 6,747,636 | B2 | 6/2004 | Martin |
| 6,756,910 | B2 | 6/2004 | Ohba et al. |
| 6,760,009 | B2 | 7/2004 | Omura et al. |
| 6,760,999 | B2 | 7/2004 | Branc et al. |
| 6,767,102 | B1 | 7/2004 | Heenan et al. |
| 6,774,889 | B1 | 8/2004 | Zhang et al. |
| 6,803,906 | B1 | 10/2004 | Morrison et al. |
| 6,828,959 | B2 | 12/2004 | Takekawa et al. |
| 6,864,882 | B2 | 3/2005 | Newton |
| 6,909,425 | B2 | 6/2005 | Matsuda et al. |
| 6,911,972 | B2 | 6/2005 | Brinjes |
| 6,919,880 | B2 | 7/2005 | Morrison et al. |
| 6,927,384 | B2 | 8/2005 | Reime et al. |
| 6,933,981 | B1 | 8/2005 | Kishida et al. |
| 6,947,029 | B2 | 9/2005 | Katagiri et al. |
| 6,947,032 | B2 | 9/2005 | Morrison et al. |
| 6,952,202 | B2 | 10/2005 | Hirabayashi |
| 6,954,197 | B2 | 10/2005 | Morrison et al. |
| 6,972,401 | B2 | 12/2005 | Akitt et al. |
| 6,972,753 | B1 | 12/2005 | Kimura et al. |
| 7,002,555 | B1 | 2/2006 | Jacobsen et al. |
| 7,007,236 | B2 | 2/2006 | Dempski et al. |
| 7,015,418 | B2 | 3/2006 | Cahill et al. |
| 7,030,861 | B1 | 4/2006 | Westerman et al. |
| 7,057,647 | B1 | 6/2006 | Monroe |
| 7,058,204 | B2 | 6/2006 | Hildreth et al. |
| 7,075,054 | B2 | 7/2006 | Iwamoto et al. |
| 7,084,857 | B2 | 8/2006 | Lieberman et al. |
| 7,084,868 | B2 | 8/2006 | Farag et al. |
| 7,098,392 | B2 | 8/2006 | Sitrick et al. |
| 7,113,174 | B1 | 9/2006 | Takekawa et al. |
| 7,121,470 | B2 | 10/2006 | McCall et al. |
| 7,133,032 | B2 | 11/2006 | Cok |
| 7,151,533 | B2 | 12/2006 | Van Ieperen |
| 7,176,904 | B2 | 2/2007 | Satoh |
| 7,184,030 | B2 | 2/2007 | McCharles et al. |
| 7,187,489 | B2 | 3/2007 | Miles |
| 7,190,496 | B2 | 3/2007 | Klug et al. |
| 7,202,860 | B2 | 4/2007 | Ogawa |
| 7,227,526 | B2 | 6/2007 | Hildreth et al. |
| 7,230,608 | B2 | 6/2007 | Cok |
| 7,232,986 | B2 | 6/2007 | Worthington et al. |
| 7,236,132 | B1 | 6/2007 | Lin et al. |
| 7,236,154 | B1 | 6/2007 | Kerr et al. |
| 7,236,162 | B2 | 6/2007 | Morrison et al. |
| 7,237,937 | B2 | 7/2007 | Kawashima et al. |
| 7,242,388 | B2 | 7/2007 | Lieberman et al. |
| 7,265,748 | B2 | 9/2007 | Ryynanen |
| 7,268,692 | B1 | 9/2007 | Lieberman |
| 7,274,356 | B2 | 9/2007 | Ung et al. |
| 7,283,126 | B2 | 10/2007 | Leung |
| 7,283,128 | B2 | 10/2007 | Sato |
| 7,289,113 | B2 | 10/2007 | Martin |
| 7,302,156 | B1 | 11/2007 | Lieberman et al. |
| 7,305,368 | B2 | 12/2007 | Lieberman et al. |
| 7,330,184 | B2 | 2/2008 | Leung |
| 7,333,094 | B2 | 2/2008 | Lieberman et al. |
| 7,333,095 | B1 | 2/2008 | Lieberman et al. |
| 7,355,593 | B2 | 4/2008 | Hill et al. |
| 7,372,456 | B2 | 5/2008 | McLintock |
| 7,375,720 | B2 | 5/2008 | Tanaka |
| RE40,368 | E | 6/2008 | Arnon |
| 7,411,575 | B2 | 8/2008 | Hill et al. |
| 7,414,617 | B2 | 8/2008 | Ogawa |
| 7,432,914 | B2 | 10/2008 | Kobayashi et al. |

| | | |
|---|---|---|
| 7,460,110 B2 | 12/2008 | Ung et al. |
| 7,477,241 B2 | 1/2009 | Lieberman et al. |
| 7,479,949 B2 | 1/2009 | Jobs et al. |
| 7,492,357 B2 | 2/2009 | Morrison et al. |
| 7,499,037 B2 | 3/2009 | Lube |
| 7,515,138 B2 | 4/2009 | Sullivan |
| 7,515,141 B2 | 4/2009 | Kobayashi |
| 7,522,156 B2 | 4/2009 | Sano et al. |
| 7,538,759 B2 | 5/2009 | Newton |
| 7,557,935 B2 | 7/2009 | Baruch |
| 7,559,664 B1 | 7/2009 | Walleman et al. |
| 7,619,617 B2 | 11/2009 | Morrison et al. |
| 7,629,967 B2 | 12/2009 | Newton |
| 7,692,625 B2 | 4/2010 | Morrison et al. |
| 7,751,671 B1 | 7/2010 | Newton et al. |
| 7,755,613 B2 | 7/2010 | Morrison et al. |
| 7,777,732 B2 | 8/2010 | Herz et al. |
| 7,781,722 B2 | 8/2010 | Lieberman et al. |
| 2001/0019325 A1 | 9/2001 | Takekawa |
| 2001/0022579 A1 | 9/2001 | Hirabayashi |
| 2001/0026268 A1 | 10/2001 | Ito |
| 2001/0033274 A1 | 10/2001 | Ong |
| 2001/0048169 A1 | 12/2001 | Nilsen et al. |
| 2001/0050677 A1 | 12/2001 | Tosaya |
| 2001/0055006 A1 | 12/2001 | Sano et al. |
| 2002/0008692 A1 | 1/2002 | Omura et al. |
| 2002/0015159 A1 | 2/2002 | Hashimoto |
| 2002/0036617 A1 | 3/2002 | Pryor |
| 2002/0041327 A1 | 4/2002 | Hildreth et al. |
| 2002/0050979 A1 | 5/2002 | Oberoi et al. |
| 2002/0064382 A1 | 5/2002 | Hildreth et al. |
| 2002/0067922 A1 | 6/2002 | Harris |
| 2002/0075243 A1 | 6/2002 | Newton |
| 2002/0080123 A1 | 6/2002 | Kennedy et al. |
| 2002/0118177 A1 | 8/2002 | Newton |
| 2002/0145595 A1 | 10/2002 | Satoh |
| 2002/0145596 A1 | 10/2002 | Vardi |
| 2002/0163505 A1 | 11/2002 | Takekawa |
| 2002/0163530 A1 | 11/2002 | Takakura et al. |
| 2003/0001825 A1 | 1/2003 | Omura et al. |
| 2003/0025951 A1 | 2/2003 | Pollard et al. |
| 2003/0034439 A1 | 2/2003 | Reime et al. |
| 2003/0043116 A1 | 3/2003 | Morrison et al. |
| 2003/0046401 A1 | 3/2003 | Abbott et al. |
| 2003/0063073 A1 | 4/2003 | Geaghan et al. |
| 2003/0071858 A1 | 4/2003 | Morohoshi |
| 2003/0085871 A1 | 5/2003 | Ogawa |
| 2003/0095112 A1 | 5/2003 | Kawano et al. |
| 2003/0137494 A1 | 7/2003 | Tulbert |
| 2003/0142880 A1 | 7/2003 | Hyodo |
| 2003/0147016 A1 | 8/2003 | Lin et al. |
| 2003/0151532 A1 | 8/2003 | Chen et al. |
| 2003/0151562 A1 | 8/2003 | Kulas |
| 2003/0156118 A1 | 8/2003 | Ayinde |
| 2003/0161524 A1 | 8/2003 | King |
| 2003/0227492 A1 | 12/2003 | Wilde et al. |
| 2004/0001144 A1 | 1/2004 | McCharles et al. |
| 2004/0012573 A1 | 1/2004 | Morrison et al. |
| 2004/0021633 A1 | 2/2004 | Rajkowski |
| 2004/0031779 A1 | 2/2004 | Cahill et al. |
| 2004/0032401 A1 | 2/2004 | Nakazawa et al. |
| 2004/0046749 A1 | 3/2004 | Ikeda |
| 2004/0051709 A1 | 3/2004 | Ogawa et al. |
| 2004/0108990 A1 | 6/2004 | Lieberman et al. |
| 2004/0125086 A1 | 7/2004 | Hagermoser et al. |
| 2004/0149892 A1 | 8/2004 | Akitt et al. |
| 2004/0150630 A1 | 8/2004 | Hinckley et al. |
| 2004/0169639 A1 | 9/2004 | Pate et al. |
| 2004/0178993 A1 | 9/2004 | Morrison et al. |
| 2004/0178997 A1 | 9/2004 | Gillespie et al. |
| 2004/0179001 A1 | 9/2004 | Morrison et al. |
| 2004/0189720 A1 | 9/2004 | Wilson et al. |
| 2004/0201575 A1 | 10/2004 | Morrison |
| 2004/0204129 A1 | 10/2004 | Payne et al. |
| 2004/0218479 A1 | 11/2004 | Iwamoto et al. |
| 2004/0221265 A1 | 11/2004 | Leung et al. |
| 2004/0252091 A1 | 12/2004 | Ma et al. |
| 2005/0020612 A1 | 1/2005 | Gericke |
| 2005/0030287 A1 | 2/2005 | Sato |
| 2005/0052427 A1 | 3/2005 | Wu et al. |
| 2005/0057524 A1 | 3/2005 | Hill et al. |
| 2005/0077452 A1 | 4/2005 | Morrison et al. |
| 2005/0078240 A1* | 4/2005 | Murade ............ 349/110 |
| 2005/0083308 A1 | 4/2005 | Homer et al. |
| 2005/0104860 A1 | 5/2005 | McCreary et al. |
| 2005/0128190 A1 | 6/2005 | Ryynanen |
| 2005/0151733 A1 | 7/2005 | Sander et al. |
| 2005/0156900 A1 | 7/2005 | Hill et al. |
| 2005/0178953 A1 | 8/2005 | Worthington et al. |
| 2005/0190162 A1 | 9/2005 | Newton |
| 2005/0218297 A1 | 10/2005 | Suda et al. |
| 2005/0241929 A1 | 11/2005 | Auger et al. |
| 2005/0243070 A1 | 11/2005 | Ung et al. |
| 2005/0248539 A1 | 11/2005 | Morrison et al. |
| 2005/0248540 A1 | 11/2005 | Newton |
| 2005/0270781 A1 | 12/2005 | Marks |
| 2005/0276448 A1 | 12/2005 | Pryor |
| 2006/0012579 A1 | 1/2006 | Sato |
| 2006/0022962 A1 | 2/2006 | Morrison et al. |
| 2006/0028456 A1 | 2/2006 | Kang |
| 2006/0033751 A1 | 2/2006 | Keely et al. |
| 2006/0034486 A1 | 2/2006 | Morrison et al. |
| 2006/0070187 A1 | 4/2006 | Chilson |
| 2006/0132432 A1 | 6/2006 | Bell |
| 2006/0139314 A1 | 6/2006 | Bell |
| 2006/0152500 A1 | 7/2006 | Weng |
| 2006/0158437 A1 | 7/2006 | Blythe et al. |
| 2006/0170658 A1 | 8/2006 | Nakamura et al. |
| 2006/0197749 A1 | 9/2006 | Popovich |
| 2006/0202953 A1 | 9/2006 | Pryor et al. |
| 2006/0202974 A1 | 9/2006 | Thielman |
| 2006/0227120 A1 | 10/2006 | Eikman |
| 2006/0232568 A1 | 10/2006 | Tanaka et al. |
| 2006/0232830 A1 | 10/2006 | Kobayashi |
| 2006/0244734 A1 | 11/2006 | Hill et al. |
| 2006/0274067 A1 | 12/2006 | Hidai |
| 2006/0279558 A1 | 12/2006 | Van Delden et al. |
| 2006/0284858 A1 | 12/2006 | Rekimoto |
| 2007/0002028 A1 | 1/2007 | Morrison et al. |
| 2007/0019103 A1 | 1/2007 | Lieberman et al. |
| 2007/0059520 A1 | 3/2007 | Hatin et al. |
| 2007/0075648 A1 | 4/2007 | Blythe et al. |
| 2007/0075982 A1 | 4/2007 | Morrison et al. |
| 2007/0089915 A1 | 4/2007 | Ogawa et al. |
| 2007/0116333 A1 | 5/2007 | Dempski et al. |
| 2007/0126755 A1 | 6/2007 | Zhang et al. |
| 2007/0132742 A1 | 6/2007 | Chen et al. |
| 2007/0139932 A1 | 6/2007 | Sun et al. |
| 2007/0152977 A1 | 7/2007 | Ng et al. |
| 2007/0152984 A1 | 7/2007 | Ording et al. |
| 2007/0152986 A1 | 7/2007 | Ogawa |
| 2007/0160362 A1 | 7/2007 | Mitsuo et al. |
| 2007/0165007 A1 | 7/2007 | Morrison et al. |
| 2007/0167709 A1 | 7/2007 | Slayton et al. |
| 2007/0205994 A1 | 9/2007 | Van Ieperen |
| 2007/0215451 A1 | 9/2007 | Sasloff et al. |
| 2007/0236454 A1 | 10/2007 | Ung et al. |
| 2007/0247435 A1 | 10/2007 | Benko et al. |
| 2007/0273842 A1 | 11/2007 | Morrison et al. |
| 2008/0012835 A1 | 1/2008 | Rimon et al. |
| 2008/0029691 A1 | 2/2008 | Han |
| 2008/0042999 A1 | 2/2008 | Martin |
| 2008/0055262 A1 | 3/2008 | Wu et al. |
| 2008/0055267 A1 | 3/2008 | Wu et al. |
| 2008/0062140 A1 | 3/2008 | Hotelling et al. |
| 2008/0062149 A1 | 3/2008 | Baruk |
| 2008/0068352 A1 | 3/2008 | Worthington et al. |
| 2008/0083602 A1 | 4/2008 | Auger et al. |
| 2008/0103267 A1 | 5/2008 | Hurst et al. |
| 2008/0106706 A1 | 5/2008 | Holmgren et al. |
| 2008/0122803 A1 | 5/2008 | Izadi et al. |
| 2008/0129707 A1 | 6/2008 | Pryor |
| 2008/0143682 A1 | 6/2008 | Shim et al. |
| 2008/0150913 A1 | 6/2008 | Bell et al. |
| 2008/0158170 A1 | 7/2008 | Herz et al. |
| 2008/0259050 A1 | 10/2008 | Lin et al. |
| 2008/0259052 A1 | 10/2008 | Lin et al. |
| 2008/0259053 A1 | 10/2008 | Newton |

| | | | | | | |
|---|---|---|---|---|---|---|
| 2009/0030853 A1 | 1/2009 | De La Motte | CN | 101019096 | 8/2007 | |
| 2009/0058832 A1 | 3/2009 | Newton | CN | 101023582 | 8/2007 | |
| 2009/0058833 A1 | 3/2009 | Newton | CN | 101663637 | 3/2010 | |
| 2009/0077504 A1 | 3/2009 | Bell et al. | CN | 101802759 | 8/2010 | |
| 2009/0122027 A1 | 5/2009 | Newton | CN | 101802760 | 8/2010 | |
| 2009/0135162 A1 | 5/2009 | Van De Wijdeven et al. | DE | 3836429 | 5/1990 | |
| 2009/0141002 A1 | 6/2009 | Sohn et al. | DE | 19810452 | 12/1998 | |
| 2009/0146972 A1 | 6/2009 | Morrison et al. | DE | 60124549 | 9/2007 | |
| 2009/0207144 A1 | 8/2009 | Bridger | DE | 102007021537 | 6/2008 | |
| 2009/0213093 A1 | 8/2009 | Bridger | EP | 0125068 | 11/1984 | |
| 2009/0213094 A1 | 8/2009 | Bridger | EP | 0181196 | 5/1986 | |
| 2009/0219256 A1 | 9/2009 | Newton | EP | 0279652 | 8/1988 | |
| 2009/0237376 A1 | 9/2009 | Bridger | EP | 0347725 | 12/1989 | |
| 2009/0278816 A1 | 11/2009 | Colson | EP | 0420335 | 4/1991 | |
| 2009/0284495 A1 | 11/2009 | Geaghan et al. | EP | 0657841 | 6/1995 | |
| 2009/0295755 A1 | 12/2009 | Chapman et al. | EP | 0762319 | 3/1997 | |
| 2009/0309844 A1 | 12/2009 | Woo et al. | EP | 0829798 | 3/1998 | |
| 2009/0309853 A1 | 12/2009 | Hildebrandt et al. | EP | 0843202 | 5/1998 | |
| 2010/0009098 A1 | 1/2010 | Bai et al. | EP | 0897161 | 2/1999 | |
| 2010/0045629 A1 | 2/2010 | Newton | EP | 0911721 | 4/1999 | |
| 2010/0045634 A1 | 2/2010 | Su et al. | EP | 1059605 | 12/2000 | |
| 2010/0079412 A1 | 4/2010 | Chiang et al. | EP | 1262909 | 12/2002 | |
| 2010/0090985 A1 | 4/2010 | Newton | EP | 1297488 | 4/2003 | |
| 2010/0090987 A1 | 4/2010 | Lin et al. | EP | 1420335 | 5/2004 | |
| 2010/0097353 A1 | 4/2010 | Newton | EP | 1450243 | 8/2004 | |
| 2010/0103143 A1 | 4/2010 | Newton et al. | EP | 1457870 | 9/2004 | |
| 2010/0177052 A1 | 7/2010 | Chang et al. | EP | 1471459 | 10/2004 | |
| 2010/0182279 A1 | 7/2010 | Juni | EP | 1517228 | 3/2005 | |
| 2010/0193259 A1 | 8/2010 | Wassvik | EP | 1550940 | 7/2005 | |
| 2010/0207911 A1 | 8/2010 | Newton | EP | 1577745 | 9/2005 | |
| 2010/0225588 A1 | 9/2010 | Newton et al. | EP | 1599789 | 11/2005 | |
| 2010/0229090 A1 | 9/2010 | Newton et al. | EP | 1611503 | 1/2006 | |
| 2010/0315379 A1 | 12/2010 | Allard et al. | EP | 1674977 | 6/2006 | |
| 2011/0019204 A1 | 1/2011 | Bridger | EP | 1736856 | 12/2006 | |
| 2011/0050649 A1 | 3/2011 | Newton et al. | EP | 1739528 | 1/2007 | |
| 2011/0199335 A1 | 8/2011 | Li et al. | EP | 1739529 | 1/2007 | |
| 2011/0199387 A1 | 8/2011 | Newton | EP | 1741186 | 1/2007 | |
| 2011/0205151 A1 | 8/2011 | Newton et al. | EP | 1759378 | 3/2007 | |
| 2011/0205155 A1 | 8/2011 | Newton et al. | EP | 1766501 | 3/2007 | |
| 2011/0205185 A1 | 8/2011 | Newton et al. | EP | 1830248 | 9/2007 | |
| 2011/0205186 A1 | 8/2011 | Newton et al. | EP | 1877893 | 1/2008 | |
| | | | EP | 2135155 | 12/2009 | |
| FOREIGN PATENT DOCUMENTS | | | EP | 2195726 | 6/2010 | |
| AU | 2004211738 | 8/2004 | EP | 2250546 | 11/2010 | |
| AU | 2006243730 | 11/2006 | ES | 2279823 | 9/2007 | |
| CA | 2058219 | 4/1993 | FR | 2521330 | 8/1983 | |
| CA | 2367864 | 4/1993 | GB | 1575420 | 9/1980 | |
| CA | 2219886 | 4/1999 | GB | 2176282 | 12/1986 | |
| CA | 2251221 | 4/1999 | GB | 2204126 | 11/1988 | |
| CA | 2267733 | 10/1999 | GB | 2263765 | 8/1993 | |
| CA | 2268208 | 10/1999 | JP | 57211637 | 12/1982 | |
| CA | 2252302 | 4/2000 | JP | 58146928 | 9/1983 | |
| CA | 2412878 | 1/2002 | JP | 61196317 | 8/1986 | |
| CA | 2341918 | 9/2002 | JP | 61260322 | 11/1986 | |
| CA | 2350152 | 12/2002 | JP | 62005428 | 1/1987 | |
| CA | 2386094 | 12/2002 | JP | 63223819 | 9/1988 | |
| CA | 2372868 | 8/2003 | JP | 1061736 | 3/1989 | |
| CA | 2390503 | 12/2003 | JP | 1154421 | 6/1989 | |
| CA | 2390506 | 12/2003 | JP | 3054618 | 3/1991 | |
| CA | 2432770 | 12/2003 | JP | 3244017 | 10/1991 | |
| CA | 2493236 | 12/2003 | JP | 4350715 | 12/1992 | |
| CA | 2448603 | 5/2004 | JP | 4355815 | 12/1992 | |
| CA | 2453873 | 7/2004 | JP | 5181605 | 7/1993 | |
| CA | 2460449 | 9/2004 | JP | 5189137 | 7/1993 | |
| CA | 2521418 | 10/2004 | JP | 5197810 | 8/1993 | |
| CA | 2481396 | 3/2005 | JP | 6110608 | 4/1994 | |
| CA | 2491582 | 7/2005 | JP | 7110733 | 4/1995 | |
| CA | 2563566 | 11/2005 | JP | 7160403 | 6/1995 | |
| CA | 2564262 | 11/2005 | JP | 7230352 | 8/1995 | |
| CA | 2501214 | 9/2006 | JP | 8016931 | 2/1996 | |
| CA | 2606863 | 11/2006 | JP | 8108689 | 4/1996 | |
| CA | 2580046 | 9/2007 | JP | 8506193 | 7/1996 | |
| CA | 2515955 | 1/2011 | JP | 8240407 | 9/1996 | |
| CN | 1277349 | 12/2000 | JP | 8315152 | 11/1996 | |
| CN | 1407506 | 4/2003 | JP | 9091094 | 4/1997 | |
| CN | 1440539 | 9/2003 | JP | 9224111 | 8/1997 | |
| CN | 1774692 | 5/2006 | JP | 9319501 | 12/1997 | |
| CN | 1784649 | 6/2006 | JP | 10031546 | 2/1998 | |
| CN | 1310126 | 4/2007 | JP | 10105324 | 4/1998 | |

| | | |
|---|---|---|
| JP | 10162698 | 6/1998 |
| JP | 10254623 | 9/1998 |
| JP | 11045155 | 2/1999 |
| JP | 11051644 | 2/1999 |
| JP | 11064026 | 3/1999 |
| JP | 11085376 | 3/1999 |
| JP | 11110116 | 4/1999 |
| JP | 11203042 | 7/1999 |
| JP | 11212692 | 8/1999 |
| JP | 11338687 | 12/1999 |
| JP | 2000105671 | 4/2000 |
| JP | 2000132340 | 5/2000 |
| JP | 2000259347 | 9/2000 |
| JP | 2001014091 | 1/2001 |
| JP | 2001075735 | 3/2001 |
| JP | 2001142642 | 5/2001 |
| JP | 2001166874 | 6/2001 |
| JP | 2001282445 | 10/2001 |
| JP | 2001282456 | 10/2001 |
| JP | 2001282457 | 10/2001 |
| JP | 2002055770 | 2/2002 |
| JP | 2002116428 | 4/2002 |
| JP | 2002196874 | 7/2002 |
| JP | 2002236547 | 8/2002 |
| JP | 2002287886 | 10/2002 |
| JP | 2003065716 | 3/2003 |
| JP | 2003158597 | 5/2003 |
| JP | 2003167669 | 6/2003 |
| JP | 2003173237 | 6/2003 |
| JP | 2003303046 | 10/2003 |
| JP | 2003533786 | 11/2003 |
| JP | 2004030003 | 1/2004 |
| JP | 2004502261 | 1/2004 |
| JP | 2005108211 | 4/2005 |
| JP | 2005182423 | 7/2005 |
| JP | 2005202950 | 7/2005 |
| JP | 2006522967 | 10/2006 |
| JP | 2007536652 | 12/2007 |
| KR | 1020050111324 | 11/2005 |
| WO | WO8901677 | 2/1989 |
| WO | WO9807112 | 2/1998 |
| WO | WO9908897 | 2/1999 |
| WO | WO9921122 | 4/1999 |
| WO | WO9928812 | 6/1999 |
| WO | WO9936805 | 7/1999 |
| WO | WO9940562 | 8/1999 |
| WO | WO0021023 | 4/2000 |
| WO | WO0124157 | 4/2001 |
| WO | WO0131570 | 5/2001 |
| WO | WO0163550 | 8/2001 |
| WO | WO0186586 | 11/2001 |
| WO | WO0191043 | 11/2001 |
| WO | WO0203316 | 1/2002 |
| WO | WO0207073 | 1/2002 |
| WO | WO0208881 | 1/2002 |
| WO | WO0221502 | 3/2002 |
| WO | WO0227461 | 4/2002 |
| WO | WO03104887 | 12/2003 |
| WO | WO03105074 | 12/2003 |
| WO | WO2004072843 | 8/2004 |
| WO | WO2004090706 | 10/2004 |
| WO | WO2004102523 | 11/2004 |
| WO | WO2004104810 | 12/2004 |
| WO | WO2005031554 | 4/2005 |
| WO | WO2005034027 | 4/2005 |
| WO | WO2005106775 | 11/2005 |
| WO | WO2005107072 | 11/2005 |
| WO | WO2005109396 | 11/2005 |
| WO | WO2006002544 | 1/2006 |
| WO | WO2006092058 | 9/2006 |
| WO | WO2006095320 | 9/2006 |
| WO | WO2006096962 | 9/2006 |
| WO | WO2006116869 | 11/2006 |
| WO | WO2007003196 | 1/2007 |
| WO | WO2007019600 | 2/2007 |
| WO | WO2007037809 | 4/2007 |
| WO | WO2007064804 | 6/2007 |
| WO | WO2007079590 | 7/2007 |
| WO | WO2007132033 | 11/2007 |
| WO | WO2007134456 | 11/2007 |
| WO | WO2008007276 | 1/2008 |
| WO | WO2008085789 | 7/2008 |
| WO | WO2008128096 | 10/2008 |
| WO | WO2009029764 | 3/2009 |
| WO | WO2009029767 | 3/2009 |
| WO | WO2009035705 | 3/2009 |
| WO | WO2009102681 | 8/2009 |
| WO | WO2009137355 | 11/2009 |
| WO | WO2009146544 | 12/2009 |
| WO | WO2010039663 | 4/2010 |
| WO | WO2010039932 | 4/2010 |
| WO | WO2010044575 | 4/2010 |
| WO | WO2010051633 | 5/2010 |
| WO | WO2010110681 | 9/2010 |
| WO | WO2010110683 | 9/2010 |

OTHER PUBLICATIONS

Anon, "SMART Board Specifications Model 680i", XP7915047 Retrieved from the Internet: URL:http://www2.smarttech.com/kbdoc/74231 [retrieved on Sep. 23, 2010], 2008, pp. 1-5.

Benko, et al., "Precise Selection Techniques for Multi-Touch Screens", *Conference on Human Factors in Computing Systems—Proceedings 2006*, 2: 1263-1273.

Buxton, et al., "Issues and Techniques in Touch-Sensitive Tablet Input", *Computer Graphics, Proceedings of SIGGRAPH'85*, 1985, 19(3): 215-223.

Canadian Patent Application No. 2412878, Office Action, mailed May 12, 2009, 4 pages.

Chinese Patent Application No. 200880105040.5, Office Action, at least as early as Aug. 11, 2011, 6 pages. (English Translation Not Available).

"Composite List of Projects 1983 to 1989", *NASA Small Business Innovation Research Program*, Aug. 1990, 132 pages.

"Digital Vision Touch Technology", White Paper, *SMART Technologies Inc.*, Feb. 2003, 10 pages.

European Application No. 02253594.2, European Search Report, mailed Jan. 5, 2006, 3 pages.

European Application No. 03257166.3, Partial European Search Report, mailed May 29, 2006, 4 pages.

European Application No. 04251392.9, European Search Report, mailed Jan. 18, 2007, 3 pages.

European Application No. 04711522.5, Office Action, mailed Jun. 29, 2010, 8 pages.

European Application No. 04711522.5, Office Action, mailed Mar. 22, 2010, 1 page.

European Application No. 04711522.5, Supplementary European Search Report, mailed Mar. 3, 2010, 3 pages.

European Application No. 06019268.9, European Search Report and Search Opinion, mailed Nov. 24, 2006, 5 pages.

European Application No. 06019269.7, European Search Report and Search Opinion, mailed Nov. 23, 2006, 5 pages.

European Application No. 07250888.0, European Search Report and Search Opinion, mailed Jun. 22, 2007, 6 pages.

European Application No. 07701682.2, Supplementary European Search Report and Search Opinion, mailed Dec. 7, 2010, 10 pages.

European Application No. 08745663.8, Office Action, mailed Dec. 27, 2010, 13 pages.

European Application No. 08745663.8, Office Action, mailed Jul. 6, 2010, 6 pages.

Förstner, "On Estimating Rotations", *Institut für Photogrammetrie, Universität Bonn*, 12 pages, 1999.

Fukushige, et al., "Interactive 3D Pointing Device Using Mirror Reflections", *Graduate School of Engineering, Osaka University*, 2006, 231-235.

Funk, "CCDs in optical touch panels deliver high resolution", *Electronic Design*, Sep. 27, 1980, pp. 139-143.

Geer, "Will Gesture—Recognition Technology Point the Way?", *Industry Trends*, Oct. 2004, 20-23.

Hartley, "Multiple View Geometry in Computer Vision", *Cambridge University Press* First published 2000, Reprinted (with corrections) 2001, pp. 70-73, 92-93, and 98-99.
Heddier Electronic, "Store Window Presentations", Feb. 2, 2011, 2 pages.
Herot, et al., "One-Point Touch Input of Vector Information for Computer Displays", *Architecture Machine Group Massachusetts Institute of Technology* Cambridge, Massachusetts, Oct. 31, 1977, pp. 210-216.
Herrero, et al., "Background Subtraction Techniques: Systematic Evaluation and Comparative Analysis", *Advanced Concepts for Intelligent Vision Systems*, Springer-Verlag Berlin Heidelberg, Sep. 2009, pp. 33-42.
Hu, et al., "Multiple-view 3-D Reconstruction Using a Mirror", *The University of Rochester*, May 2005, 14 pages.
International Application No. PCT/CA2001/00980, International Search Report, mailed Oct. 22, 2001, 3 pages.
International Application No. PCT/CA2004/001759, International Search Report and Written Opinion, mailed Feb. 21, 2005, 7 pages.
International Application No. PCT/CA2007/002184, International Search Report, mailed Mar. 13, 2008, 3 pages.
International Application No. PCT/CA2008/001350, International Search Report, mailed Oct. 17, 2008, 5 pages.
International Application No. PCT/CA2009/000733, International Search Report and Written Opinion, mailed Sep. 10, 2009, 6 pages.
International Application No. PCT/CA2010/001085, International Search Report, mailed Oct. 12, 2010, 4 pages.
International Application No. PCT/NZ2004/000029, International Preliminary Report on Patentability, issued May 20, 2005, 21 pages.
International Application No. PCT/NZ2004/000029, International Search Report and Written Opinion, mailed Jun. 10, 2004, 6 pages.
International Application No. PCT/NZ2005/000092, International Preliminary Report on Patentability, completed Dec. 30, 2006, 3 pages.
International Application No. PCT/NZ2005/000092, International Search Report, mailed Sep. 27, 2006, 4 pages.
International Application No. PCT/NZ2010/000049, International Search Report and Written Opinion, mailed Oct. 14, 2010, 12 pages.
International Application No. PCT/NZ2010/000051, International Search Report and Written Opinion, mailed Oct. 5, 2010, 15 pages.
International Application No. PCT/US2008/060102, International Preliminary Report on Patentability, mailed Oct. 22, 2009, 10 pages.
International Application No. PCT/US2008/060102, International Search Report and Written Opinion, mailed Feb. 12, 2009, 20 pages.
International Application No. PCT/US2008/074749, International Preliminary Report on Patentability, issuance Mar. 2, 2010, 9 pages.
International Application No. PCT/US2008/074749, International Search Report and Written Opinion, mailed Feb. 11, 2009, 15 pages.
International Application No. PCT/US2008/074755, International Preliminary Report on Patentability, issuance Mar. 2, 2010, 8 pages.
International Application No. PCT/US2008/074755, International Search Report and Written Opinion, mailed Jan. 29, 2009, 8 pages.
International Application No. PCT/US2009/030694, International Preliminary Report on Patentability, completion Apr. 26, 2010, 10 pages.
International Application No. PCT/US2009/030694, International Search Report, mailed Aug. 5, 2009, 5 pages.
International Application No. PCT/US2009/033624, International Preliminary Report on Patentability and Written Opinion, issuance Aug. 17, 2010, 6 pages.
International Application No. PCT/US2009/033624, International Search Report, mailed Mar. 29, 2010, 3 pages.
International Application No. PCT/US2009/042547, International Preliminary Report on Patentability, mailed Nov. 9, 2010, 6 pages.
International Application No. PCT/US2009/042547, International Search Report and Written Opinion, mailed Sep. 2, 2010, 12 pages.
International Application No. PCT/US2009/058682, International Search Report and Written Opinion, mailed Apr. 27, 2010, 15 pages.
International Application No. PCT/US2009/059193, International Search Report and Written Opinion, mailed Dec. 7, 2009, 15 pages.
International Application No. PCT/US2010/059050, International Search Report and Written Opinion, mailed Mar. 23, 2011, 9 pages.
International Application No. PCT/US2010/059104, International Search Report and Written Opinion, mailed Jun. 6, 2011, 14 pages.
International Application No. PCT/US2010/059078, International Search Report and Written Opinion, mailed Aug. 2, 2011, 17 pages.
"Introducing the NextWindow 1900 Optical Touch Screen", *A NextWindow White Paper, Next Window Human Touch*, May 22, 2007, 13 pages.
INTUIFACE Press Release, "IntuiLab introduces IntuiFace, an interactive table and its application platform", Nov. 30, 2007, 1 page.
INTUILAB, "Overview Page", Mar. 9, 2011, 1 page.
Japanese Patent Application No. 2005-000268, Office Action, mailed Jul. 5, 2010, Office Action—3 pages, English Translation—3 pages.
Japanese Patent Application No. 2006-502767, Office Action, mailed Jan. 20, 2009, Office Action—2 pages, English Translation—3 pages.
Japanese Patent Application No. 2006-502767, Office Action, mailed Jun. 22, 2010, Office Action—3 pages, English Translation—4 pages.
Japanese Patent Application No. 2007-511305, Office Action, mailed Feb. 1, 2011, Office Action—2 pages, English Translation—5 pages.
Kanatani, "Camera Calibration", *Geometric Computation for Machine Vision*, Oxford Engineering Science Series, 1993, 37(2): 56-63.
Korean Patent Application No. 10-2005-7014885, Office Action, dated Aug. 9, 2010, English Translation—5 pages.
Lane, et al., "Reflective Interaction in Virtual Environments", *Eurographics*, 2001, 20(3): 7 pages.
Lo, "Solid-state image sensor: technologies and applications", SPIE Proceedings, 1998, 3422: 70-80.
Loinaz, et al., "A 200-mW, 3.3-V, CMOS Color Camera IC Producing 352×288 24-b Video at 30 Frames", *IEEE Journal of Solid-State Circuits*, Dec. 1998, 33(12); 2092-2103.
Piccardi, et al., "Background subtraction techniques: a review", *2004 IEEE International Conference on Systems, Man and Cybernetics*, Oct. 10, 2004, 4: 3099-3104.
Pogue, "The Multi-Touch Screen", *POGUE's Posts*, Mar. 27, 2007, 13 pages.
Singapore Patent Application No. 201001122-9, Office Action, dated May 3, 2011, 9 pages.
Tappert, et al., "On-Line Handwriting Recognition—A Survey", *Proceedings of the 9th International Conference on Pattern Recognition (ICPR), Rome*, IEEE Computer Society Press, Nov. 14-17, 1988, 2: 1123-1132.
"ThruGlass™ Projected Capacitive Touchscreens Specifications", *Micro Touch*, 2000, 4 pages.
"Touch Panel", *Veritas et Visus*, Nov. 2005, vol. 1, No. 1.
"Touch Panel", *Veritas et Visus*, Dec. 2005, Issue 2 of 10.
"Touch Panel", *Veritas et Visus*, Feb. 2006, vol. 1, No. 3.
"Touch Panel", *Veritas et Visus*, Mar. 2006, vol. 1, No. 4.
"Touch Panel", *Veritas et Visus*, May 2006, vol. 1, No. 5.
"Touch Panel", *Veritas et Visus*, Jun. 2006, vol. 1, No. 6.
"Touch Panel", *Veritas et Visus*, Jul. 2006, vol. 1, No. 7.
"Touch Panel", *Veritas et Visus*, Aug. 2006, vol. 1, No. 8.
"Touch Panel", *Veritas et Visus*, Oct. 2006, vol. 1, No. 9.
"Touch Panel", *Veritas et Visus*, Nov. 2006, vol. 1, No. 10.
"Touch Panel", *Veritas et Visus*, Dec. 2006, vol. 2, No. 1.
"Touch Panel", *Veritas et Visus*, Feb. 2007, vol. 2, No. 2.
"Touch Panel", *Veritas et Visus*, Mar. 2007, vol. 2, No. 3.
"Touch Panel", *Veritas et Visus*, May 2007, vol. 2, No. 4.
"Touch Panel", *Veritas et Visus*, Jul. 2007, vol. 2, No. 5.
"Touch Panel", *Veritas et Visus*, Oct. 2007, vol. 2, No. 6.
"Touch Panel", *Veritas et Visus*, Jan. 2008, vol. 2, Nos. 7-8.
"Touch Panel", *Veritas et Visus*, Mar. 2008, vol. 2, Nos. 9-10.
"Touch Panel", *Veritas et Visus*, Aug. 2008, vol. 3, Nos. 1-2.
"Touch Panel", *Veritas et Visus*, Nov. 2008, vol. 3, Nos. 3-4.
"Touch Panel", *Veritas et Visus*, Jan. 2009, vol. 3, Nos. 5-6.
"Touch Panel", *Veritas et Visus*, Mar. 2009, vol. 3, Nos. 7-8.
"Touch Panel", *Veritas et Visus*, May 2009, vol. 3, No. 9.
"Touch Panel", *Veritas et Visus*, Sep. 2009, vol. 4, Nos. 2-3.
"Touch Panel", *Veritas et Visus*, Sep. 2010, vol. 5, Nos. 2-3.
"Touch Panel", *Veritas et Visus*, Nov. 2010, vol. 5, No. 4.

Photobit Corporation, "VGA-format CMOS Camera-on-a-Chip for Multimedia Applications", 1999, 2 pages.

Villamor, et al., "Touch Gesture Reference Guide", Last updated Apr. 15, 2010, 7 pages.

Wang, et al., "Stereo camera calibration without absolute world coordinate information", *SPIE*, Jun. 14, 1995, 2620: 655-662.

Wrobel, et al., "Minimum Solutions for Orientation", *Calibration and Orientation of Cameras in Computer Vision, Springer Series in Information Sciences*, 2001, 34: 28-33.

* cited by examiner

TOUCH SCREEN SIGNAL PROCESSING

PRIORITY CLAIM

This application claims priority as a continuation-in-part of U.S. patent application Ser. No. 11/033,183, filed Jan. 11, 2005, which is a continuation of Application No. PCT NZ2004/000029, published as WO 2004/072843, filed Feb. 16, 2004, which claims priority to NZ Application No. 524211, filed Feb. 14, 2003, each of which is incorporated by reference herein in its entirety.

TECHNICAL FIELD

The present invention relates to a touch sensitive screen and in particular to optically detecting the presence of an object by using signal processing.

BACKGROUND

Touch screens can take on forms including, but not limited to, resistive, capacitive, surface acoustic wave (SAW), infrared (IR), and optical. Each of these types of touch screen has its own features, advantages and disadvantages.

Resistive is a common type of touch screen technology. It is a low-cost solution found in many touch screen applications, including hand-held computers, PDA's, consumer electronics, and point-of-sale-applications. A resistive touch screen uses a controller and a specifically coated glass overlay on the display face to produce the touch connection. The primary types of resistive overlays are 4-wire, 5-wire, and 8 wires. The 5-wire and 8-wire technologies are more expensive to manufacture and calibrate, while 4-wire provides lower image clarity. Two options are generally given: polished or anti-glare. Polished offers clarity of image, but generally introduces glare. Anti-glare will minimize glare, but will also further diffuse the light thereby reducing the clarity. One benefit of using a resistive display is that it can be accessed with a finger (gloved or not), pen, stylus, or a hard object. However, resistive displays are less effective in public environments due to the degradation in image clarity caused by the layers of resistive film, and its susceptibility to scratching. Despite the trade-offs, the resistive screen is the most popular technology because of its relatively low price (at smaller screen sizes), and ability to use a range of input means (fingers, gloves, hard and soft stylus).

Capacitive touch screens can comprise glass and may be designed for use in ATM's and similar kiosk type applications. A small current of electricity runs across the screen with circuits located at the corners of the screen to measure the capacitance of a person touching the overlay. Touching the screen interrupts the current and activates the software operating the kiosk. Because the glass and bezel that mounts it to the monitor can be sealed, the touch screen is both durable and resistant to water, dirt and dust. This makes it commonly used in harsher environments like gaming, vending retail displays, public kiosks and industrial applications. However, the capacitive touch screen is only activated by the touch of a human finger and a gloved finger, pen, stylus or hard object will not work. Hence, it is inappropriate for use in many applications, including medical and food preparation.

Surface acoustic wave (SAW) technology provides better image clarity because it uses pure glass construction. A SAW touch screen uses a glass display overlay. Sound waves are transmitted across the surface of the display. Each wave is spread across the screen by bouncing off reflector arrays along the edges of the overlay. Two receivers detect the waves. When the user touches the glass surface, the user's finger absorbs some of the energy of the acoustic wave and the controller circuitry measures the touch location. SAW touch screen technology is used in ATM's, Amusements Parks, Banking and Financial Applications and kiosks. The technology is not able to be gasket sealed, and hence is not suitable to many industrial or commercial applications. Compared to resistive and capacitive technologies, it provides superior image clarity, resolution, and higher light transmission.

Infrared technology relies on the interruption of an infrared light grid in front of the display screen. The touch frame or opto-matrix frame contains a row of infrared LEDs and photo transistors; each mounted on two opposite sides to create a grid of invisible infrared light. The frame assembly is comprised of printed wiring boards on which the opto-electronics are mounted and is concealed behind an infrared-transparent bezel. The bezel shields the opto-electronics from the operating environment while allowing the infrared beams to pass through. The infrared controller sequentially pulses the LEDs to create a grid of infrared light beams. When a stylus, such as a finger, enters the grid, it obstructs the beams. One or more phototransistors detect the absence of light and transmit a signal that identifies the x and y coordinates. Infrared touch screens are often used in manufacturing and medical applications because they can be completely sealed and operated using any number of hard or soft objects. An issue with infrared can relate to the "seating" of the touch frame, which may be slightly above the screen. Consequently, it is susceptible to "early activation" before the finger or stylus has actually touched the screen. The cost to manufacture the infrared bezel can be quite high.

Optical imaging for touch screens uses a combination of line-scan cameras, digital signal processing, front or back illumination and algorithms to determine a point of touch. The imaging lenses image the user's finger, stylus or object by scanning along the surface of the display. This type of touch screen is susceptible to false readings due to moving shadows and bright lights and also requires that the screen be touched before a reading is taken. Attempts have been made to overcome these disadvantages. Touch screens using optical imaging technology are disclosed in the following publications.

Examples of touch screen technology can be found in U.S. Pat. Nos. 4,943,806; 5,914,709; 5,317,140; 5,698,845; 4,782, 328; and U.S. Pat. No. 4,868,551.

SUMMARY

Objects and advantages of the present subject matter will be apparent to one of ordinary skill in the art upon careful review of the present disclosure and/or practice of one or more embodiments of the claimed subject matter.

Accordingly in a first aspect the invention may broadly be said to consist in a touch display comprising: a screen for a user to touch and view an image on or through; light sources at one or more edges of said screen, said light sources directing light across the surface of said screen; at least two cameras having outputs, each said camera located at the periphery of said screen to image the space in front of said screen, said output including a scanned image; means for processing said outputs to detect the level of light, said light including: direct light from said light sources, and/or reflected light from said light sources; a processor receiving the processed outputs of said cameras, said processor employing triangulation techniques and said processed outputs to determine whether the processed outputs indicate the presence of an object proximate to said screen and if so the location of said object.

Preferably said processed output indicates the relative bearing of a presumed object location relative to said camera. Preferably said processed output indicates the relative bearing of a presumed object location relative to the centre of the lens of said camera. Preferably said processor determines location of said object as a planar screen co-ordinate.

Preferably said light sources are behind said screen arranged to project light through said screen and said display includes at each edge having a light source, light deflectors in front of said screen, directing light emitted from said light sources across the surface of said screen.

Preferably said cameras are line scan cameras, said camera output including information on line scanned and said processor using said information in determining location of said object.

Preferably said touch display can include means for modulating said light from said light sources to provide a frequency band within the imageable range of said cameras and means for excluding image data outside said frequency band.

Preferably said means for processing said outputs includes said means for excluding image data outside said frequency band and said means for excluding image data outside said frequency includes filtering. Preferably, filtering includes applying a filter selected from the group consisting of: a comb filter; a high pass filter; a notch filter; and a band pass filter.

Preferably said touch display can include means for controlling said light sources and means for taking and processing an image taken in a non lighted ambient light state and in a lighted state, wherein said means for processing said outputs subtracts the ambient state from the lighted state before detecting the level of light.

Preferably said light sources are LEDs and said touch display includes means for controlling the operation of sections of said light source independent of other sections of said light source. Preferably means for controlling the operation of sections of said light source includes means for independently controlling the effective intensity of said light source.

Preferably said means for controlling sections of said light source comprises wiring said sections in antiphase and driving using a bridge drive. Preferably means for controlling sections of said light source comprises using a diagonal bridge drive. Preferably said means for controlling sections of said light source comprises using a shift register for each section to be controlled.

Preferably said means for taking and processing images includes controlling sections of said light sources and each said camera and said means for processing said outputs includes processing information on whether a said section is lighted or not. Preferably some section are lighted and others are not when an image is taken.

Accordingly in a second aspect the invention may broadly be said to consist in a touch display comprising: a screen for a user to touch and view an image on or through; light sources at one or more edges edge of said screen, said light sources directing light across the surface of said screen; at least two cameras having outputs located at the periphery of said screen, said cameras located so as not to receive direct light from said light sources, each said camera imaging the space in front of said screen, said output including a scanned image; means for processing said outputs to detect level of reflected light; and a processor receiving the processed outputs of said cameras, said processor employing triangulation techniques and said processed outputs to determine whether the processed outputs indicate the presence of an object proximate to said screen and if so the location of said object.

Preferably said processed output indicates the relative bearing of a presumed object location relative to said camera.

Preferably said processed output indicates the relative bearing of a presumed object location relative to the centre of the lens of said camera. Preferably said processor determines location of said object as a planar screen co-ordinate.

Preferably said touch display can include means for modulating said light from said light sources to provide a frequency band within the imageable range of said cameras; and means for excluding image data outside said frequency band. Preferably said means for processing said outputs includes said means for excluding image data outside said frequency band and said means for excluding image data outside said frequency includes filtering. Preferably filtering includes applying a filter selected from the group consisting of a comb filter; a high pass filter; a notch filter; and a band pass filter.

Preferably said touch display includes means for controlling said light sources and means for taking and processing an image taken in a non lighted ambient light state and in a lighted state, wherein said means for processing said outputs subtracts the ambient state from the lighted state before detecting the level of light. Preferably said light sources are LEDs and said touch display includes means for controlling the operation of sections of said light source independent of other sections of said light source.

Preferably means for controlling the operation of sections of said light source includes means for independently controlling the effective intensity of said light source. Preferably the means for controlling sections of said light source comprises wiring said sections in antiphase and driving using a bridge drive. Preferably the means for controlling sections of said light source comprises using a diagonal bridge drive. Preferably the means for controlling sections of said light source comprises using a shift register for each section to be controlled.

Preferably said means for taking and processing images includes controlling sections of said light sources and each said camera and said means for processing said outputs includes processing information on whether a said section is lighted or not. Preferably some sections are lighted and others are not when an image is taken.

Preferably said screen is reflective, said camera further images said screen, and said means for processing outputs detects the level of light from the mirror image. Preferably said processed out put indicates the relative bearing of a presumed object relative to said camera and the distance of said object from said screen.

Accordingly in a third aspect the invention may broadly be said to consist in a method of receiving user inputs in reference to an image including the steps of providing a screen for a user to touch and view an image on or through; providing light sources at one or more edges of said screen, said light sources directing light across the surface of said screen; providing at least two cameras having outputs, each said camera located at the periphery of said screen to image the space in front of said screen, said output including a scanned image; processing said outputs to detect the level of light, said light including: direct light from said light sources, and/or reflected light from said light sources; processing the processed outputs of said cameras, and using triangulation techniques to obtain the location of said object.

Preferably said processed output indicates the relative bearing of a presumed object location relative to a said camera.

Preferably said processed output indicates the relative bearing of a presumed object location relative to the centre of the lens of said camera. Preferably said location of is a planar screen co-ordinate. Preferably said light sources are behind said screen and arranged to project light through said screen and said display includes at each edge having a light source, light deflectors in front of said screen, directing light emitted from said light sources across the surface of said screen.

Preferably said cameras are line scan cameras, said camera output including information on line scanned and said processor using said information in determining location of said object.

Preferably said method includes the steps of: modulating said light from said light sources to provide a frequency band within the imageable range of said cameras and excluding image data outside said frequency band. Preferably the step of processing said outputs includes the steps of excluding image data outside said frequency band and said step of excluding image data outside said frequency includes filtering. Preferably filtering includes the step of applying a filter selected from the group consisting of: a comb filter; a high pass filter; a notch filter; and a band pass filter.

Preferably said method includes the steps of: controlling said light sources and taking and processing an image taken in a non lighted ambient light state and in a lighted state, wherein said step of processing said outputs subtracts the ambient state from the lighted state before detecting the level of light. Preferably said light sources are LEDs and said touch display includes means for controlling the operation of sections of said light source independent of other sections of said light source. Preferably the step of controlling the operation of sections of said light source includes independently controlling the effective intensity of said light source.

Preferably the step of controlling sections of said light source comprises wiring said sections in antiphase and driving using a bridge drive. Preferably the step of controlling sections of said light source comprises using a diagonal bridge drive. Preferably the step of controlling sections of said light source comprises using a shift register for each section to be controlled.

Preferably the step of taking and processing images includes controlling sections of said light sources and each said camera and said step of processing said outputs includes processing information on whether a said section is lighted or not. Preferably some sections are lighted and others are not when an image is taken.

Accordingly in a fourth aspect the invention may broadly be said to consist in a method of receiving user inputs in reference to an image including the steps of: providing a screen for a user to touch and view an image on or through; providing light sources at one or more edges edge of said screen, said light sources directing light across the surface of said screen; providing at least two cameras having outputs located at the periphery of said screen, said cameras located so as not to receive direct light from said light sources, each said camera imaging the space in front of said screen, said output including a scanned image; processing said outputs to detect level of reflected light; and processing the processed outputs of said cameras, employing triangulation techniques and said processed outputs to determine whether the processed outputs indicate the presence of an object proximate to said screen and if so the location of said object.

Preferably said processed output indicates the relative bearing of a presumed object location relative to said camera. Preferably said processed output indicates the relative bearing of a presumed object location relative to the centre of the lens of said camera. Preferably said processor determines location of said object as a planar screen co-ordinate.

Preferably said method includes: modulating said light from said light sources to provide a frequency band within the imageable range of said cameras and excluding image data outside said frequency band. The method can use means for processing said outputs includes said means for excluding image data outside said frequency band and said means for excluding image data outside said frequency includes filtering. Preferably filtering includes applying a filter selected from the group consisting of: a comb filter; a high pass filter; a notch filter; and a band pass filter.

Preferably said method includes controlling said light sources and taking and processing an image taken in a non lighted ambient light state and in a lighted state, wherein said means for processing said outputs subtracts the ambient state from the lighted state before detecting the level of light.

Preferably said light sources are LEDs and said touch display includes means for controlling the operation of sections of said light source independent of other sections of said light source. Preferably the means for controlling the operation of sections of said light source includes means for independently controlling the effective intensity of said light source. Preferably the means for controlling sections of said light source comprises wiring said sections in antiphase and driving using a bridge drive.

Preferably controlling sections of said light source comprises using a diagonal bridge drive. Preferably controlling sections of said light source comprises using a shift register for each section to be controlled.

Preferably taking and processing images includes controlling sections of said light sources and each said camera and said means for processing said outputs includes processing information on whether a said section is lighted or not. Preferably some sections are lighted and others are not when an image is taken.

Preferably said screen is reflective, said camera further images said screen, and said means for processing outputs detects the level of light from the mirror image. Preferably said processed out put indicates the relative bearing of a presumed object relative to said camera and the distance of said object from said screen.

Accordingly in a fifth aspect the invention may broadly be said to consist in a method of receiving user inputs in reference to an image, the method comprising providing at least one light source on or adjacent the periphery of said image, said light source(s) directing light across said image; detecting at least two locations on or adjacent the periphery of said image, the level of light and providing said level as an output; and processing said outputs using triangulation techniques to determine whether said outputs indicate the presence of an object proximate to said image and if so the location of said object.

Preferably said locations are substantially non-opposite so that when an object is present said output is substantially indicative of light reflected from said object.

Accordingly in a sixth aspect the invention may broadly be said to consist in a user input device for locating an object with reference to an image comprising: at least one light source at or proximate to the periphery of said image, said light source directing light across said image; at one detector having an output, said detector located or in proximity to said image to image the space in front of said screen, said output indicative of a level of light; and a processor receiving said outputs and using triangulation techniques and said outputs determining the presence of said object and if so the location of said object.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different features is intended to illustrate like or analogous components.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made without departing from the scope or spirit of the disclosure and claims. For instance, features illustrated or described as part of one embodiment may be used on another embodiment to yield still further embodiments. Thus, it is intended that the present disclosure includes any modifications and variations as come within the scope of the appended claims and their equivalents.

The present invention relates to improvements in signal processing in the field of optical imaging touch screens. In the preferred embodiment the optical touch screen uses front illumination and is comprised of a screen, a series of light sources, and at least two area scan cameras located in the same plane and at the periphery of the screen. In another embodiment, the optical touch screen uses backlight illumination; the screen is surrounded by an array of light sources located behind the touch panel which are redirected across the surface of the touch panel. At least two line scan cameras are used in the same plane as the touch screen panel. The signal processing improvements created by these implementations are that an object can be sensed when in close proximity to the surface of the touch screen, calibration is simple, and the sensing of an object is not effected by the changing ambient light conditions, for example moving lights or shadows.

In additional embodiments, a coordinate detection system is configured to direct light through a touch surface, with the touch surface corresponding to the screen or a material above the screen.

Figure 3:
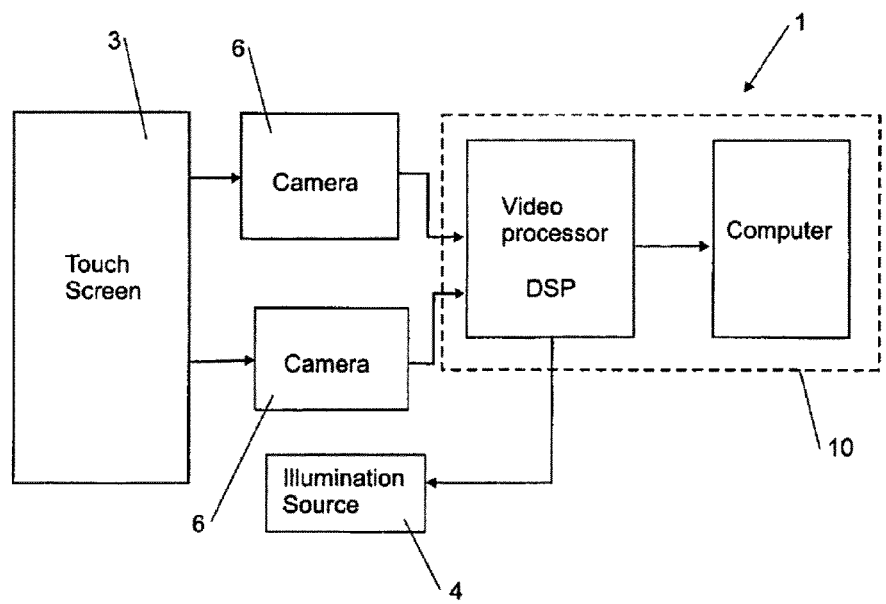
FIG. 3 is a block diagram of the system of the preferred embodiment of the touch screen of the present invention.

A block diagram of a general touch screen system 1 is shown in FIG. 3. Information flows from the cameras 6 to the video processing unit and computer, together referred to as the processing module 10. The processing module 10 performs many types of calculations including filtering, data sampling, and triangulation and controls the modulation of the illumination source 4.

Front Illumination Touch Screen

Figure 1:
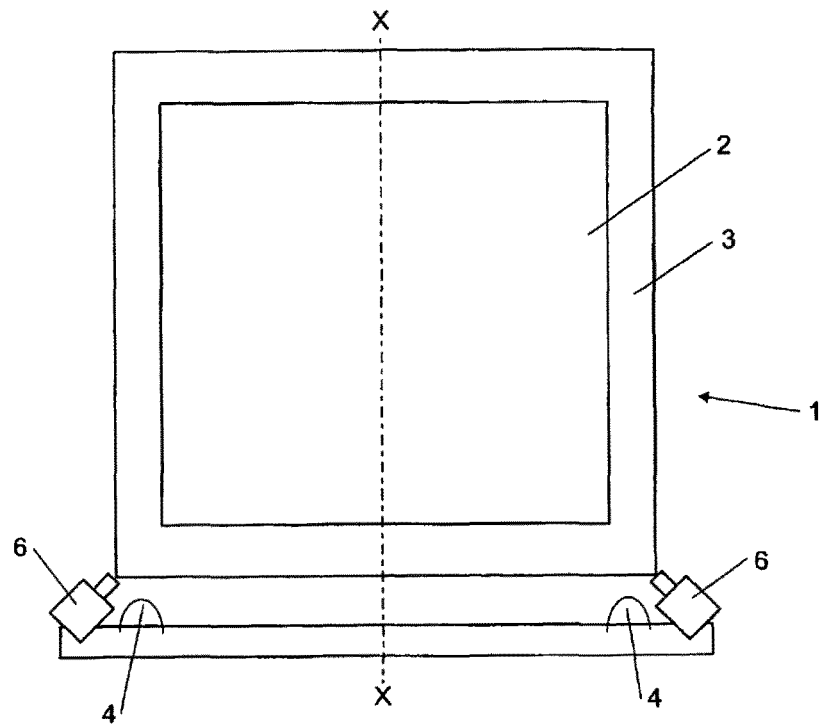
FIG. 1 is a diagrammatic illustration of a front view of the preferred embodiment of the touch screen of the present invention.

The preferred embodiment of the touch screen of the present invention is shown in FIG. 1. The touch screen system 1 is comprised of a monitor 2, a touch screen panel 3, at least two lights 4, a processing module (not shown) and at least two area scan cameras 6. The monitor 2, which displays information to the user, is positioned behind the touch screen panel 3. Below the touch screen panel 3 and the monitor 2 are the area scan cameras 6 and light sources 4. The light sources 4 are preferably Light Emitting Diodes (LED) but may be another type of light source, for example, a fluorescent tube. LEDs are ideally used as they may be modulated as required, they do not have an inherent switching frequency. The cameras 6 and LEDs 4 are in the same plane as the touch panel 3.

Figure 1A:
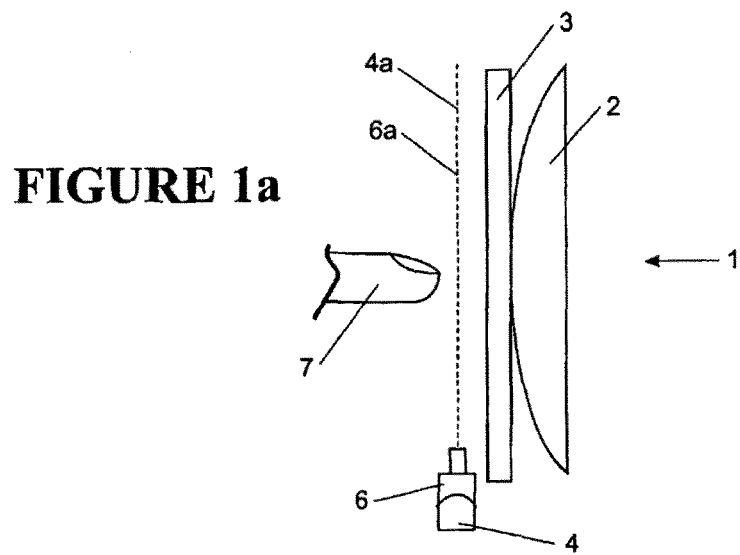
FIG. 1a is an illustration of a cross sectional view through X-X of FIG. 1.
Figure 1B:
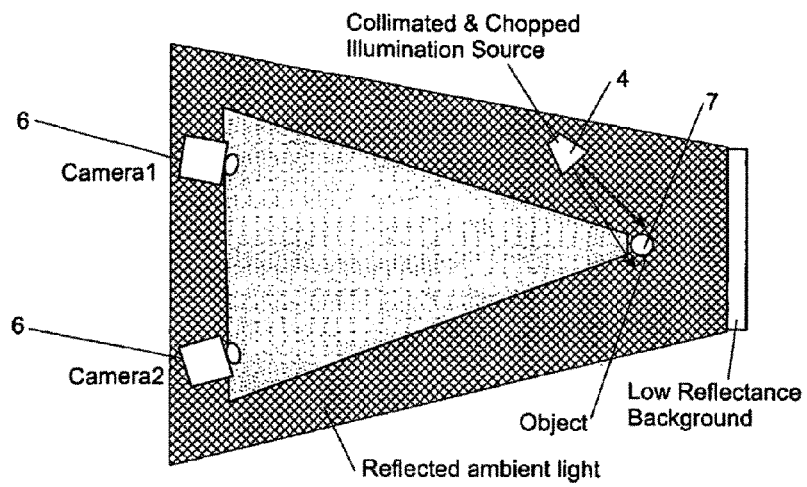
FIG. 1b is an illustration of front illumination of the preferred embodiment of the touch screen of the present invention.

Referring to FIG. 1a, the viewing field 6a of the area scan camera 6 and the radiation path 4a of the LEDs 4 are in the same plane and parallel to the touch panel 3. When an object 7, shown as a finger, enters into the radiation path 4a, it is illuminated. This is typically known as front panel illumination or object illumination. In FIG. 1b, this principle is again illustrated. Once a finger 7 enters into the radiation field 4a, a signal is reflected back to the camera 6. This indicates that a finger 7 is near to or touching the touch panel 3. In order to determine if the finger 7 is actually touching the touch panel 3, the location of the touch panel 3 must be established. This is performed using another signal, a mirrored signal.

Mirrored Signal

The mirrored signal occurs when the object 7 nears the touch panel 3. The touch panel 3 is preferably made from glass which has reflective properties. As shown in FIG. 2, the finger 7 is positioned at a distance 8 above the touch panel 3 and is mirrored 7a in the touch panel 3. The camera 6 (only shown as the camera lens) images both the finger 7 and the reflected image 7a. The image of finger 7 is reflected 7a in panel 3; this can be seen through the field lines 6b, 6c and virtual field line 6d. This allows the camera 6 to image the reflected 7a image of the finger 7. The data produced from the camera 6 corresponds to the position of the field lines 6e, 6b as they enter the camera 6. This data is then fed into a processing module 10 for analysis.

Figure 2A:
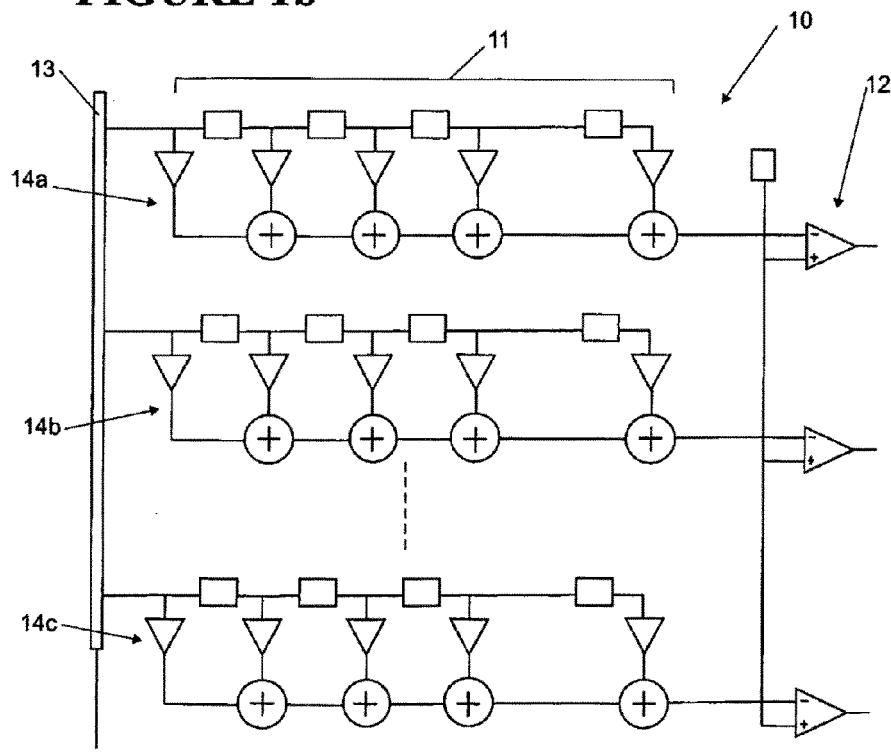
FIG. 2a is a block diagram of the filter implementation of the preferred embodiment of the touch screen of the present invention.
Figure 2:
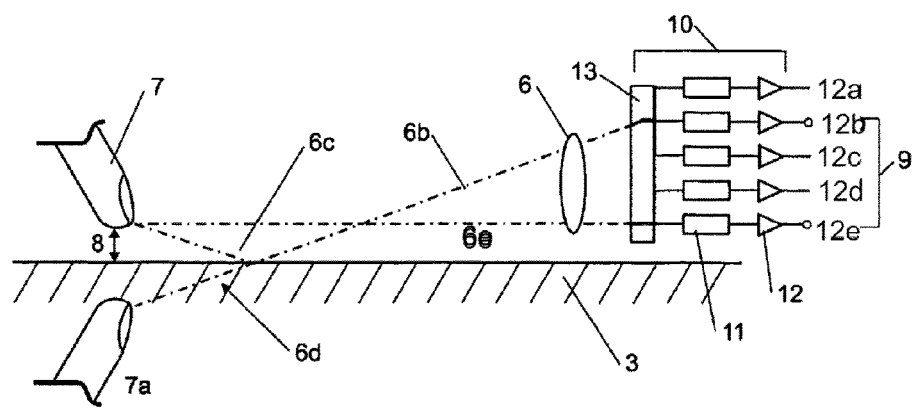
FIG. 2 is an illustration of the mirroring effect in the preferred embodiment of the touch screen of the present invention.
Figure 2B:
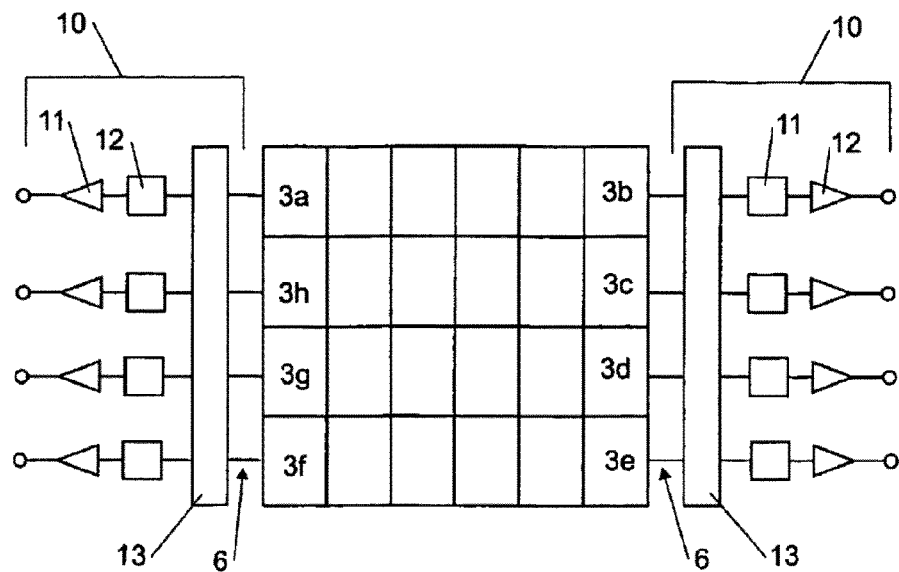
FIG. 2b is a diagrammatic illustration of the pixels seen by an area camera and transmitted to the processing module in the preferred embodiment of the present invention.

A section of the processing module 10 is shown in FIG. 2a. Within the processing module 10 is a series of scanning imagers 13 and digital filters 11 and comparators 12 implemented in software. There are a set number of pixels on the touch panel, for example 30,000 pixels. These may be divided up into 100 columns of 300 pixels. The number of pixels may be more or less than the numbers used, the numbers are used for example only. In this situation, there are 30,000 digital filters 11 and comparators 12, broken up into 100 columns of 300 pixels, this forms a matrix similar to the matrix of pixels on the monitor 2. A representation of this is shown in FIG. 2a as one column is serviced by one image scanner 13 and three sets 14a, 14b, 14c of digital filters 11 and comparators 12, this allows information from three pixels to be read. A more illustrated example of this matrix is shown in FIG. 2b. Eight pixels 3a-3h are connected, in groups of columns, to an image scanner 13 that is subsequently connected to a filter 11 and a comparator 12 (as part of the processing module 10). The numbers used in FIG. 2b are used for illustration only; an accurate number of pixels could be greater or less in number. The pixels shown in this diagram may not form this shape in the panel 3, their shape will be dictated by the position and type of camera 6 used.

Referring back to FIG. 2, finger 7 and mirrored finger 7a activates at least two pixels; two pixels are used for simplicity. This is shown by the field lines 6e and 6b entering the processing module 10. This activates the software so the two signals pass through a digital filter 11 and a comparator 12 and results in a digital signal output 12a-12e. The comparator 12 compares the output from the filter 11 to a predetermined threshold value. If there is a finger 7 detected at the pixel in question, the output will be high, otherwise it will be low.

The mirrored signal also provides information about the position of the finger 7 in relation to the cameras 6. It can determine the height 8 of the finger 7 above the panel 3 and its angular position. The information gathered from the mirrored signal is enough to determine where the finger 7 is in relation to the panel 3 without the finger 7 having to touch the panel 3.

Figure 4:
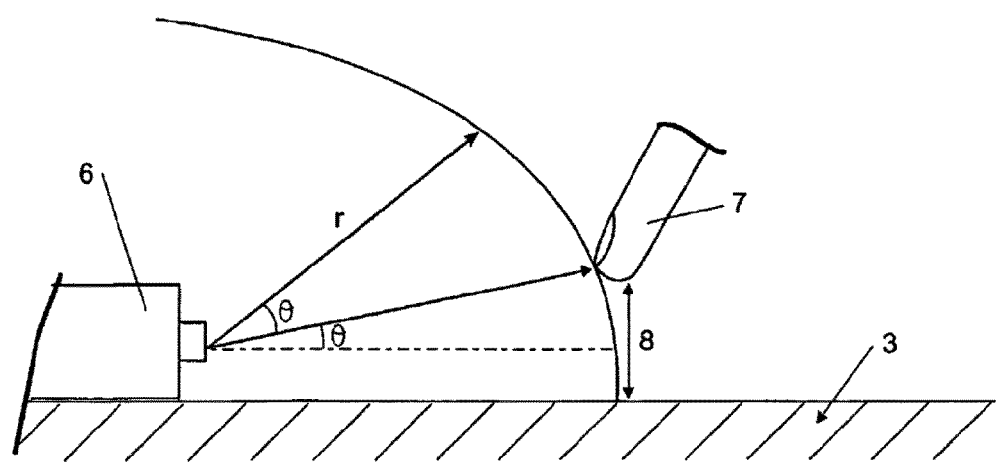
FIG. 4 is a side view of the determination of the position of an object using the mirrored signal in the preferred embodiment of the touch screen of the present invention.
Figure 4A:
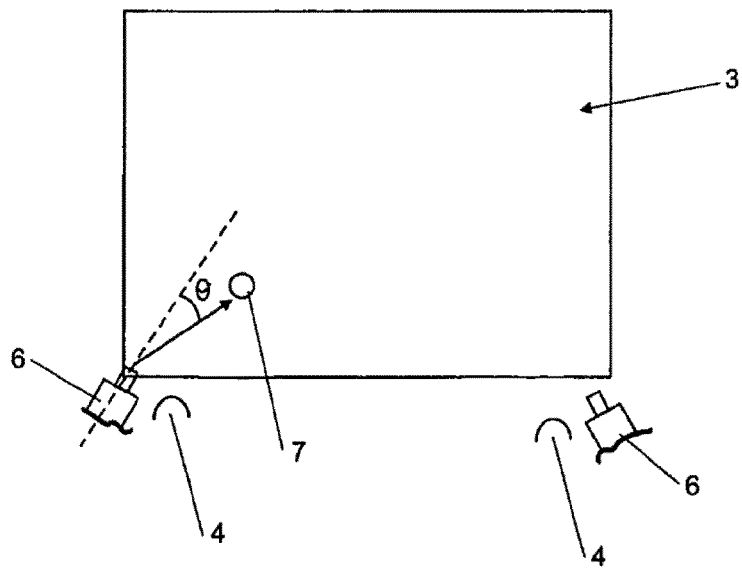
FIG. 4a is top view of the determination of the position of an object using the mirrored signal in the preferred embodiment of the touch screen of the present invention.

FIGS. 4 and 4a show the positional information that is able to be obtained from the processing of the mirrored signal. The positional information is given in polar co-ordinates. The positional information relates to the height of the finger 7, and the position of the finger 7 over the panel 3.

Referring again to FIG. 2, the height that the finger 7 is above the panel 3 can be seen in the distance between the outputs 12a-12e. In this example the finger 7 is a height 8 above the panel 3 and the outputs 12b and 12e are producing a high signal. The other outputs 12a, 12d are producing a low signal. It has been found that the distance 9 between the high outputs 12b, 12e is twice as great as the actual height 8 of the finger above the panel 3.

Modulating

The processing module 10 modulates and collimates the LEDs 4 and sets a sampling rate. The LEDs 4 are modulated, in the simplest embodiment the LEDs 4 are switched on and off at a predetermined frequency. Other types of modulation are possible, for example modulation with a sine wave. Modulating the LEDs 4 at a high frequency results in a frequency reading (when the finger 7 is sensed) that is significantly greater than any other frequencies produced by changing lights and shadows. The modulation frequency is greater than 500 Hz but no more than 10 kHz.

Sampling

The cameras 6 continuously generate an output, which due to data and time constraints is periodically sampled by the processing module 10. In the preferred embodiment, the sampling rate is at least two times the modulation frequency; this is used to avoid aliasing. The modulation of the LEDs and the sampling frequency does not need to be synchronised.

Filtering

Figure 6:
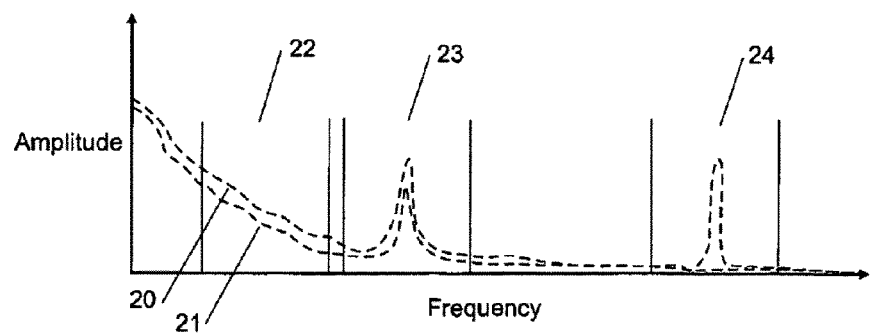
FIG. 6 is a graph representing in the frequency domain the output from the imager in the processing module in the preferred embodiment of the touch screen of the present invention.

The output in the frequency domain from the scanning imager 13 is shown in FIG. 6. In FIG. 6, there are two typical graphs, one showing when there is no object being sensed 21 and one showing when a finger is sensed 20. In both graphs there is a region of movement of shadows 22 at approximately 5 to 20 Hz, and an AC mains frequency region 23 at approximately 50 to 60 Hz.

In the preferred embodiment when there is not object in the field of view, no signal is transmitted to the area camera so there are no other peaks in the output. When an object is in the field of view, there is a signal 24 corresponding to the LED modulated frequency, for example 500 Hz. The lower unwanted frequencies 22, 23 can be removed by various forms of filters. Types of filters can include comb, high pass, notch, and band pass filters.

Figure 6A:
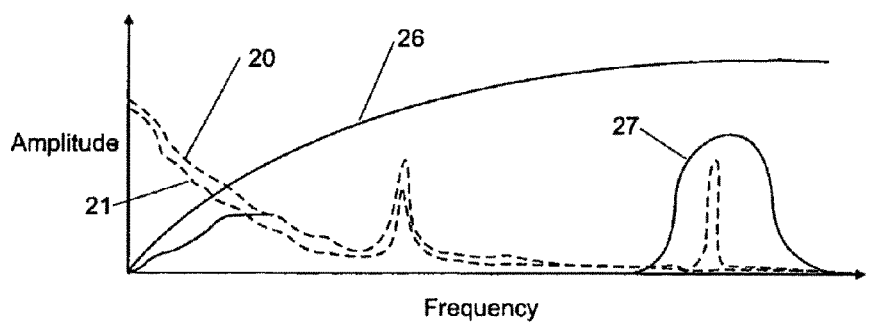
FIG. 6a is a graph representing in the frequency domain the filters responses on the signal from the imager in the preferred embodiment of the touch screen of the present invention.
Figure 6B:
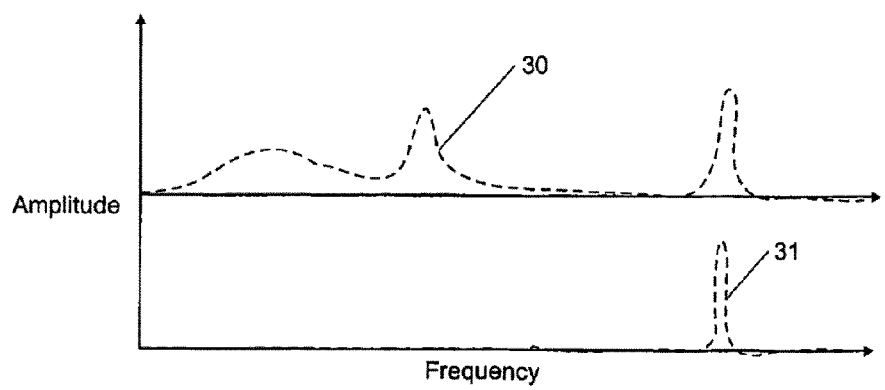
FIG. 6b is a graph representing in the frequency domain the separation of the object from the background after two types of filtering in the preferred embodiment of the touch screen of the present invention.

In FIG. 6a the output from the image scanner is shown with a couple of different filter responses 26, 27 being applied to the signal 20. In a simple implementation a 500 Hz comb filter 26 may be implemented (if using a 500 Hz modulation frequency). This will remove only the lowest frequencies. A more advanced implementation would involve using a band pass 27 or notch filter. In this situation, all the data, except the region where the desired frequency is expected, is removed. In FIG. 6a this is shown as a 500 Hz narrow band filter 27 applied to the signal 20 with a modulation frequency of 500 Hz. These outputs 30, 31 from the filters 26, 27 are further shown in FIG. 6b. The top graph shows the output 30 if a comb filter 26 is used while the bottom graph shows the output 31 when a band filter 27 is used. The band filter 27 removes all unwanted signals while leaving the area of interest.

Once the signal has been filtered and the signal in the area of interest identified, the resulting signal is passed to the comparators to be converted into a digital signal and triangulation is performed to determine the actual position of the object. Triangulation is known in the prior art and disclosed in U.S. Pat. No. 5,534,917 and U.S. Pat. No. 4,782,328, and are herein incorporated by reference.

Calibration

Figure 5:
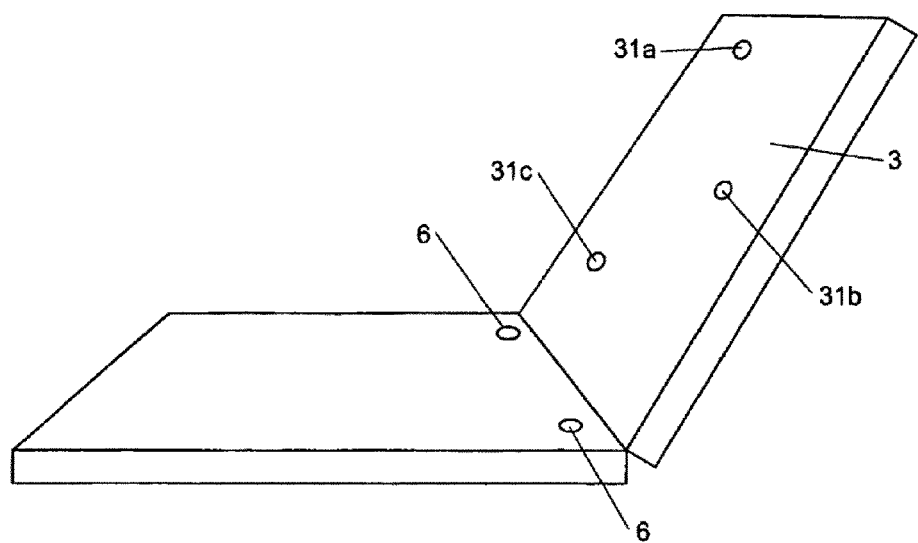
FIG. 5 is an illustration of the calibration in the preferred embodiment of the touch screen of the present invention.

The preferred embodiment of the touch screen of the present invention uses very quick and easy calibration that allows the touch screen to be used in any situation and moved to new locations, for example if the touch screen is manufactured as a lap top. Calibration involves touching the panel 3 in three different locations 31a, 31b, 31c, as shown in FIG. 5; this defines the touch plane of the touch panel 3. These three touch points 31a, 31b, 31c provide enough information to the processing module (not shown) to calculate the position and size of the touch plane in relation to the touch panel 3. Each touch point 31a, 31b, 31c uses both mirrored and direct signals, as previously described, to generate the required data. These touch points 31a, 31b, 31c may vary around the panel 3, they need not be the actual locations shown.

Back Illumination Touch Screen

Figure 7D:
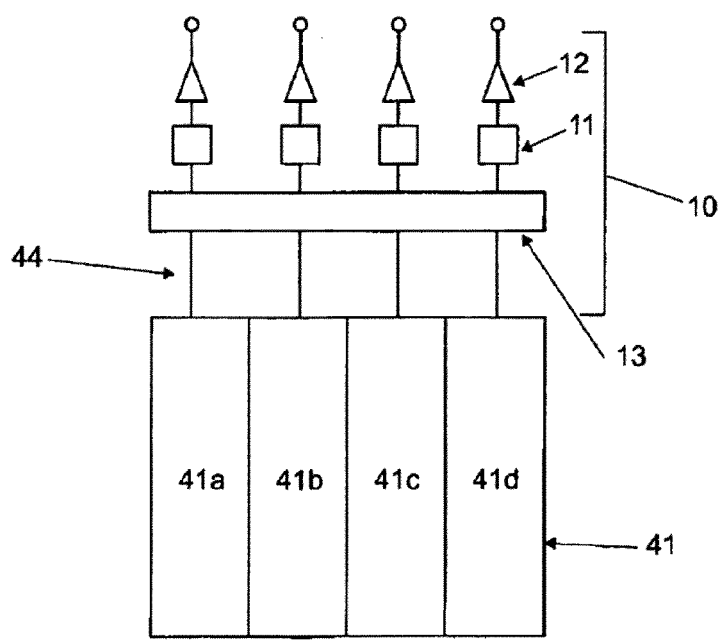
FIG. 7d is a diagrammatic illustration of the pixels seen by a line scan camera and transmitted to the processing module in the alternate embodiment of the present invention.
Figure 7:
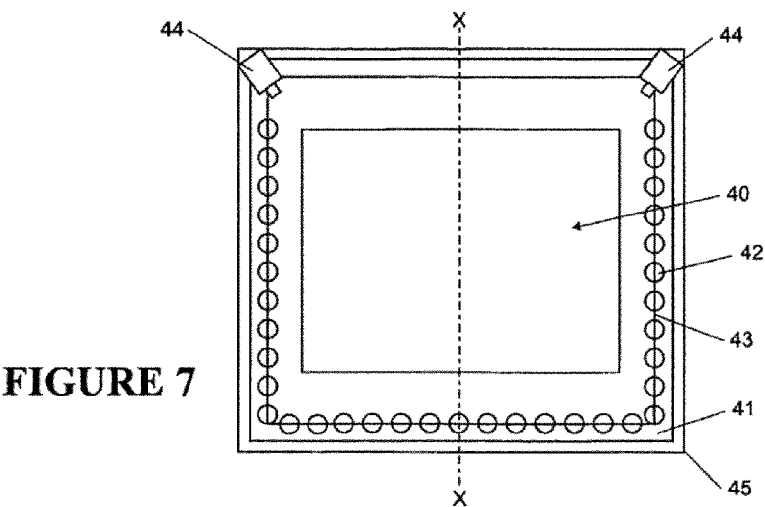
FIG. 7 is an illustration of a front view of the alternate embodiment of the touch screen of the present invention.

FIG. 7 shows the alternate embodiment of the touch screen of the present invention. As in the preferred embodiment, the monitor 40 is behind the touch panel 41 and around the sides and the lower edge of the panel 41 is an array of lights 42. These point outwards towards the user and are redirected across the panel 41 by a diffusing plate 43. The array of lights 42 consists of numerous Light Emitting Diodes (LEDs). The diffusing plates 43 are used redirect and diffuse the light emitted from the LEDs 42 across the panel 41. At least two line-scan cameras 44 are placed in the upper two corners of the panel 3 and are able to image an object. The cameras 44 can be alternately placed at any position around the periphery of the panel 41. Around the periphery of the touch panel 41 is a bezel 45 or enclosure. The bezel 45 acts as a frame that stops the light radiation from being transmitted to the external environment. The bezel 45 reflects the light rays into the cameras 44 so a light signal is always read into the camera 44 when there is no object near the touch panel 41.

Alternately, the array of lights 42 may be replaced with cold cathode tubes. When using a cold cathode tube, a diffusing plate 43 is not necessary as the outer tube of the cathode tube diffuses the light. The cold cathode tube runs along the entire length of one side of the panel 41. This provides a substantially even light intensity across the surface of the panel 41. Cold cathode tubes are not preferably used as they are difficult and expensive to modify to suit the specific length of each side of the panel 41. Using LED's allows greater flexibility in the size and shape of the panel 41.

Figure 7A:
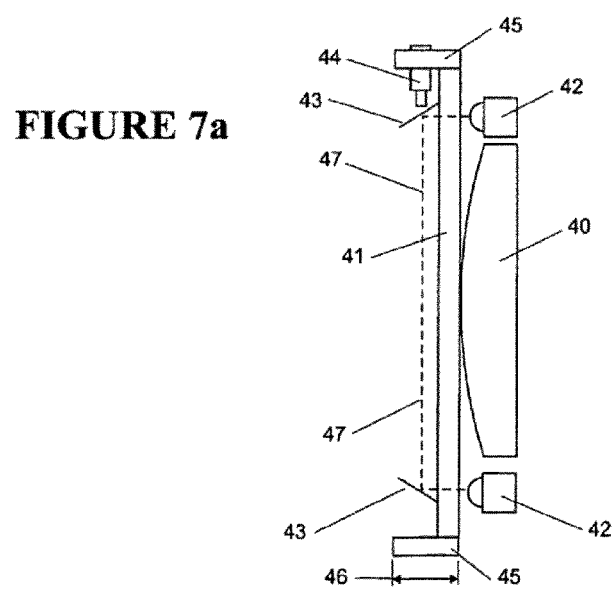
FIG. 7a is an illustration of a cross sectional view through X-X of the alternate embodiment of the touch screen of the present invention.

The diffusing plate 43 is used when the array of lights 42 consists of numerous LED's. The plate 43 is used to diffuse the light emitted from an LED and redirect it across the surface of panel 41. As shown in FIG. 7a, the light 47 from the LEDs 42 begins its path at right angles to the panel 41. Once it hits the diffusing plate 43, it is redirected parallel to the panel 41. The light 47 travels slightly above the surface of the panel 41 so to illuminate the panel 41. The light 47 is collimated and modulated by the processing module (not shown) as previously described.

Referring to FIG. 7a, the width 46 of the bezel 45 can be increased or decreased. Increasing the width 46 of the bezel 45 increases the distance at which an object can be sensed. Similarly, the opposite applies to decreasing the width 10 of the bezel 45. The line scan cameras 44 consists of a CCD element, lens and driver control circuitry. When an image is seen by the cameras 44 a corresponding output signal is generated.

Figure 7B:
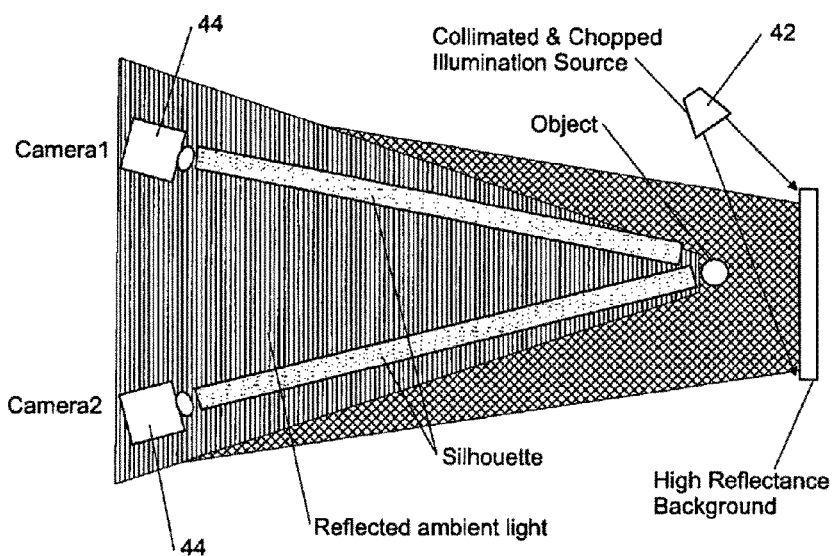
FIG. 7b is an illustration of rear illumination of the alternate embodiment of the touch screen of the present invention.
Figure 7C:
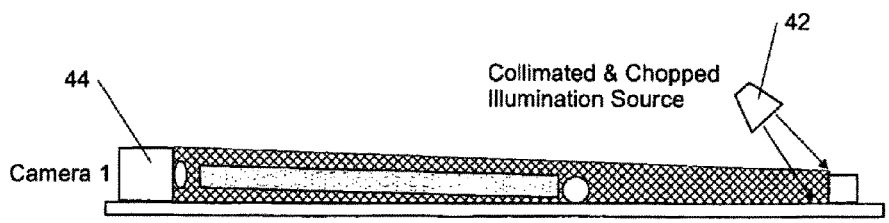
FIG. 7c is an illustration of rear illumination controlling the sense height of the alternate embodiment of the present invention.

Referring to FIGS. 7b and 7c, when the touch screen is not being used, i.e. when there is no user interaction or input, all the light emitted from the array of lights 42 is transmitted to the line-scan cameras 44. When there is user input, i.e. a user selects something on the screen by touching it with their finger; a section of the light being transmitted to the camera 44 is interrupted. Through calculations utilising triangulation algorithms with the outputted data from the camera 44, the location of the activation can be determined.

The line scan cameras 44 can read two light variables, namely direct light transmitted from the LED's 42 and reflected light. The method of sensing and reading direct and mirrored light is similar to what has been previously described, but is simpler as line scan cameras can only read one column from the panel at once; it is not broken up into a matrix as when using an area scan camera. This is shown in FIG. 7d where the panel 41 is broken up into sections 41a-41d (what the line scan camera can see). The rest of the process has been described previously. The pixels shown in this diagram may not form this shape in the panel 41, their shape will be dictated by the position and type of camera 44 used.

In the alternate embodiment, since the bezel surrounds the touch panel, the line scan cameras will be continuously reading the modulated light transmitted from the LEDs. This will result in the modulated frequency being present in the output whenever there is no object to interrupt the light path. When an object interrupts the light path, the modulated frequency in the output will not be present. This indicates that an object is in near to or touching the touch panel. The frequency present in the output signal is twice the height (twice the amplitude) than the frequency in the preferred embodiment. This is due to both signals (direct and mirrored) being present at once.

Figure 8:
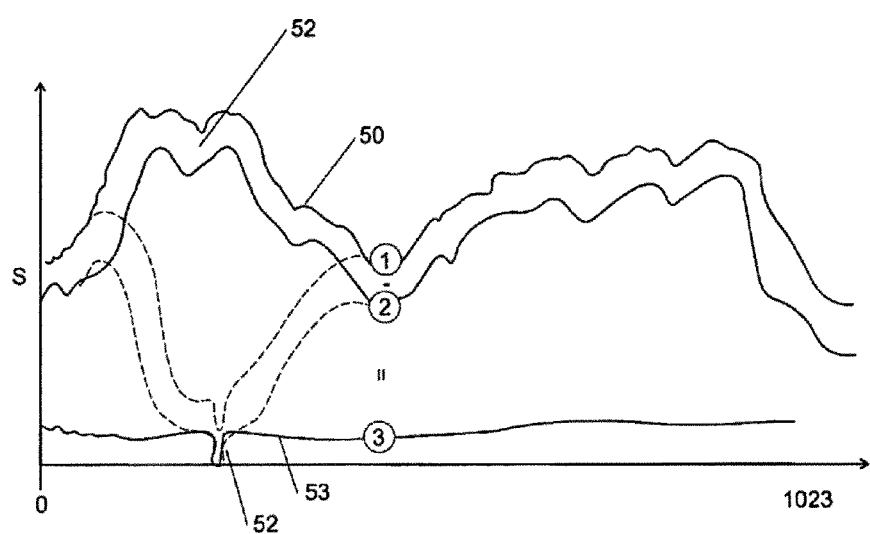
FIG. 8 is a graph representing simple separation of an object from the background in the alternate embodiment of the present invention.

In a further alternate embodiment, shown in FIG. 8, the output from the camera is sampled when the LEDs are modulating on and off. This provides a reading of ambient light plus backlight 50 and a reading of ambient light alone 51. When an object interrupts the light from the LEDs, there is a dip 52 in the output 50. As ambient light varies a lot, it is difficult to see this small dip 52. For this reason, the ambient reading 51 is subtracted from the ambient and backlight reading 50. This results in an output 54 where the dip 52 can be seen and thus simple thresholding can be used to identify the dip 52.

Calibration of this alternate embodiment is performed in the same manner as previously described but the touch points 31a, 31b, 31c (referring to FIG. 5) cannot be in the same line, they must be spread about the surface of the panel 3.

In FIG. 7 the backlight is broken up into a number of individual sections, 42a to 42f. One section or a subset of sections is activated at any time. Each of these sections is imaged by a subset of the pixels of the image sensors 44. Compared to a system with a single backlight control, the backlight emitters are operated at higher current for shorter periods. As the average power of the emitter is limited, the peak brightness is increased. Increased peak brightness improves the ambient light performance.

The backlight switching may advantageously be arranged such that while one section is illuminated, the ambient light level of another section is being measured by the signal processor. By simultaneously measuring ambient and backlit sections, speed is improved over single backlight systems.

The backlight brightness is adaptively adjusted by controlling LED current or pulse duration, as each section is activated so as to use the minimum average power whilst maintaining a constant signal to noise plus ambient ratio for the pixels that view that section.

Control of the plurality of sections with a minimum number of control lines is achieved in one of several ways.

Figure 9A:
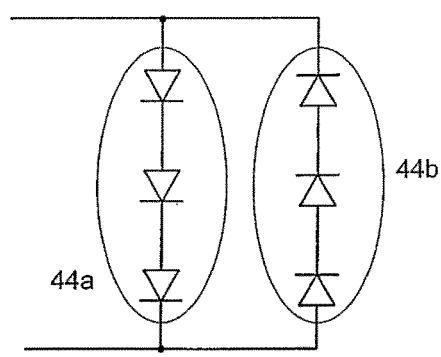
FIG. 9a shows a two section backlight driven by two wires of the present invention.

In a first implementation of a two section backlight the two groups of diodes 44a, 44b can be wired antiphase and driven with bridge drive as shown in FIG. 9a.

Figure 9B:
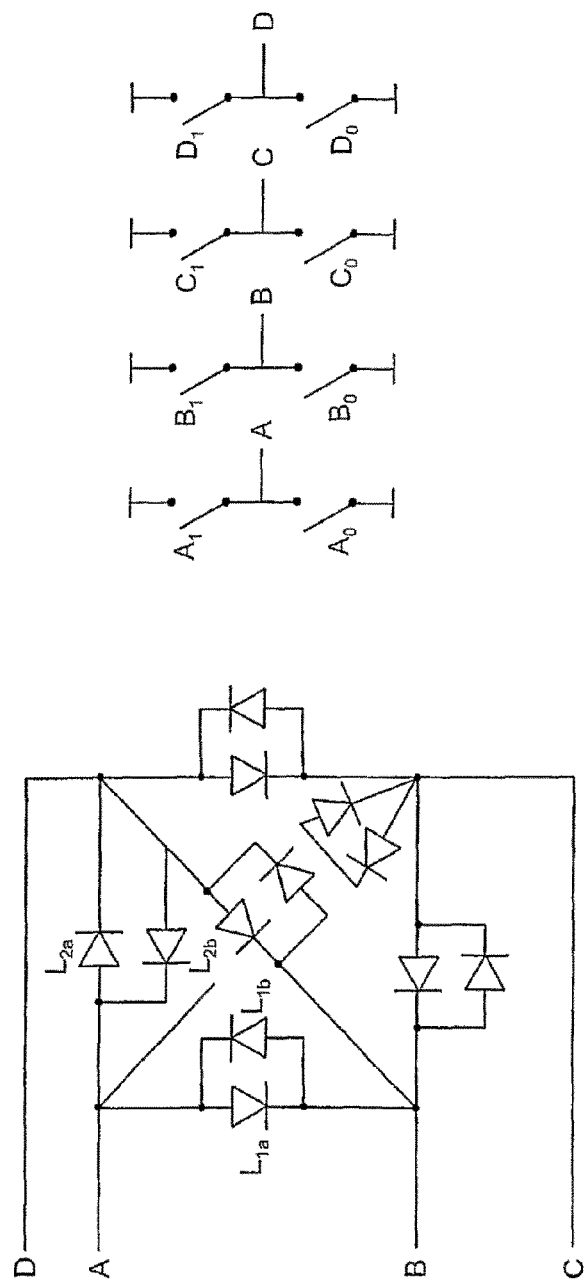
FIG. 9b shows a twelve section backlight driven by 4 wires of the present invention.

In a second implementation with more than two sections, diagonal bridge drive is used. In FIG. 9b, 4 wires are able to select 1 of 12 sections, 5 wires can drive 20 sections, and 6 wires drive 30 sections.

Figure 9C:
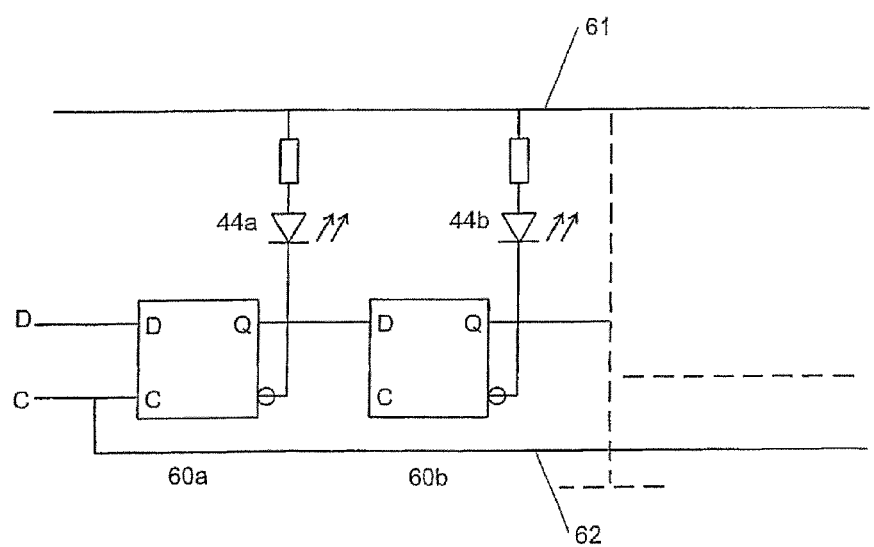
FIG. 9c shows a piece of distributed shift register backlight of the present invention.

In a third implementation shown in FIG. 9c, for a large number of sections, a shift register 60 is physically distributed around the backlight, and only two control lines are required.

X-Y multiplexing arrangements are well known in the art. For example an 8+4 wires are used to control a 4 digit display with 32 LED's. FIG. 9b shows a 4 wire diagonal multiplexing arrangement with 12 LEDs. The control lines A, B, C, D are driven by tristate outputs such as are commonly found at the pins of microprocessors such as the Microchip PIC family. Each tristate output has two electronic switches which are commonly mosfets. Either or neither of the switches can be turned on. To operate led L1a, switches A1 and B0 only are enabled. To operate L1B, A0 and B1 are operated. To operate L2a, A1 and D0 are enabled, and so on. This arrangement can be used with any number of control lines, but is particularly advantageous for the cases of 4, 5, 6 control lines, where 12, 20, 30 LEDs can be controlled whilst the printed circuit board tracking remains simple. Where higher control numbers are used it may be advantageous to use degenerate forms where some of the possible LEDs are omitted to ease the practical interconnection difficulties.

The diagonal multiplexing system has the following features it is advantageous where there are 4 or more control lines; it requires tri-state push-pull drivers on each control line; rather than using an x-y arrangement of control lines with led's at the crossings, the arrangement is represented by a ring of control lines with a pair of antiphase LED's arranged on each of the diagonals between the control lines. Each LED can be uniquely selected, and certain combinations can also be selected; and it uses the minimum possible number of wires where emc filtering is needed on the wires there is a significant saving in components.

The above examples referred to various illumination sources and it should be understood that any suitable radiation source can be used. For instance, light emitting diodes (LEDs) may be used to generate infrared (IR) radiation that is directed over one or more optical paths in the detection plane. However, other portions of the EM spectrum or even other types of energy may be used as applicable with appropriate sources and detection systems.

Several of the above examples were presented in the context of a touch-enabled display. However, it will be understood that the principles disclosed herein could be applied even in the absence of a display screen when the position of an object relative to an area is to be tracked. For example, the touch area may feature a static image or no image at all.

Additionally, in some embodiments a "touch detection" system may be more broadly considered a "coordinate detection" system since, in addition to or instead of detecting touch of the touch surface, the system may detect a position/coordinate above the surface, such as when an object hovers but does not touch the surface. Thus, the use of the terms "touch detection," "touch enabled," and/or "touch surface" is not meant to exclude the possibility of detecting hover-based or other non-touch input.

Figure 10A:
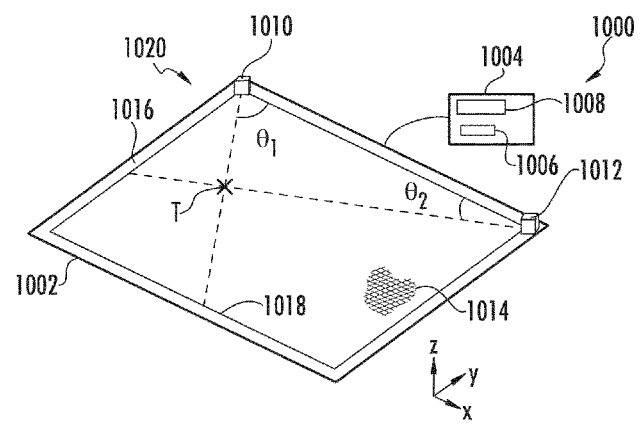
FIGS. 10A, 10B, and 10C are views of an exemplary coordinate detection system.
Figure 10B:
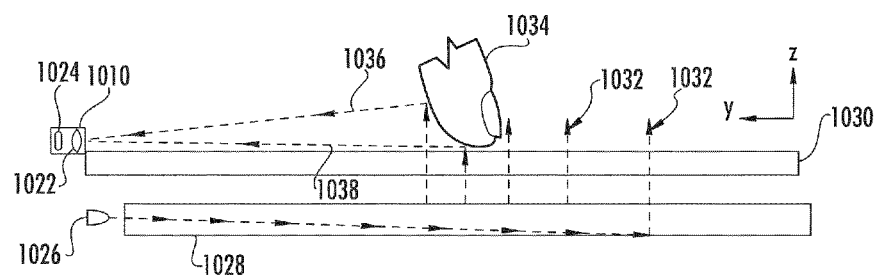
Figure 10C:
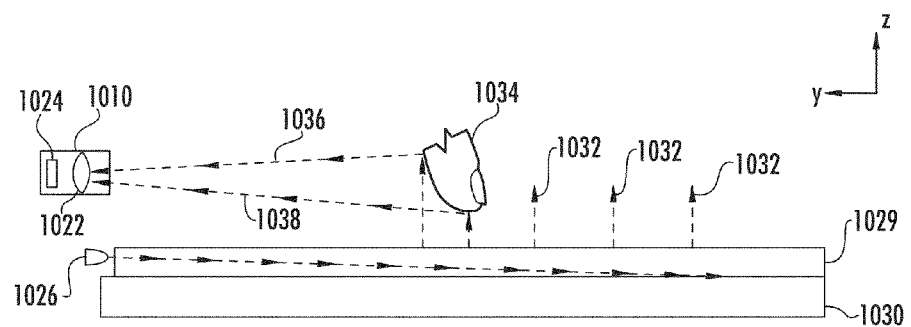

FIGS. 10A, 10B and 10C are views of a coordinate detection system 1000 according to some embodiments of the invention. In this example, the coordinate detection system comprises a touch-enabled display 1002 and a processing unit 1004 that comprises one or more processors 1006 and a computer-readable medium 1008. For example, processing unit 1004 may comprise a digital signal processor or microcontroller configured to drive components of the coordinate detection system and detect input based on one or more program components in RAM, ROM, or other memory comprising computer-readable medium 1008 and/or by accessing stored code (e.g., from a disk). As another example, processing unit 1004 may comprise a computer include in or interfaced to display screen 1002. For example, display screen 1002 may be intended for use with a personal or laptop computer, a mobile device (e.g., a media player, personal digital assistant, portable phone, etc.), or another computing system that includes one or more processors configured to function by program components.

Coordinate detection system 1000 includes at least one imaging device. In this example, two cameras 1010 and 1012 are positioned at corners of display 1002. Display 10002 defines a touch area, which in this example corresponds to the edges of the display, and a touch surface, which can correspond to the top side of the screen or may correspond to a material or element positioned above the screen to protect the screen from damage and/or to serve other purposes. In such embodiments, the outermost layer of the material or element may comprise the touch surface.

Cameras 1010 are positioned at edges of the touch area in this example. However, embodiments include one or more cameras positioned outside the touch area, but not at an edge. For example, a camera may be positioned remote from the edges and the area.

Display 1002 includes an array of pixels 1014; for purposes of clarity, only a small portion of pixels 1014 are illustrated, but the pixels may extend the entire width (x direction in FIG. 10A) and height (y direction in FIG. 10A) of display 1002. The display area is bounded by edges, two of which (1016 and 1018) are shown in FIG. 10A.

Coordinate detection system 1000 can include an illumination system comprising one or more light sources. FIG. 10B shows one example of use of an illumination system. FIG. 10B is a cross-sectional view as indicated by arrow 1020 in FIG. 10A.

As can be seen in FIG. 10B, a light source 1026 is included in the illumination system, which further includes a backlight assembly 1028 that is configured to direct light from light source 1026 and then upward through the screen as shown by the ray traces. In this example, the screen comprises an LCD array 1030. As shown by ray traces 1032, light is directed upward (z direction in FIGS. 10-12) through the array of pixels of LCD array 1030. Ultimately, the light is directed through the touch surface of the coordinate detection system; this may be the screen or another layer above the screen (e.g., protective film, layer of glass/plastic, etc.) with "above" referring to material positioned farther in the z+ direction in FIGS. 10-12 relative to the top of the screen.

In this example, an object 1034 is interfering with light from light source 1026 that has been projected through the screen. As shown by ray traces 1036 and 1038, the space above the touch surface is imaged by camera 1010 to detect the presence of object 1034. In this example, object 1034 comprises a finger, but any type of object can be detected. Camera 1010 is illustrated as comprising a lens 1022 and a detector 1024.

In some embodiments, detector 1024 comprises a line detector or an area detector. Based on the pattern of detected light, processor 1006 can identify whether object 1034 has interfered with light exiting screen 1002. For example, if detector 1024 comprises a line detector, then angles $\Theta 1$ and $\Theta 2$ as shown in FIG. 10A can be determined to triangulate a touch point T, indicating a relative location within the touch area at which the touch occurs. For example, pixel coordinates for the touched point or an area considered to be the touch point may be determined.

If detector 1024 comprises an area detector, an image of object 1034 can be used to determine the relative location within the touch area and/or other information. For example, the height of object 1034 over the top surface of display 1002 may be determined and used to determine whether object 1034 is hovering or is actually touching the top surface of display 1002.

Any number or type of light sources 1026 can be used. For example, one or more light emitting diodes (LEDs) may be positioned at an edge of screen 1002 but below the top side of the screen. As shown in FIG. 10B, the diodes can be configured to direct light in a direction substantially parallel to the top side of the screen, with the backlight assembly 1028 used to redirect the light out the top of the screen as noted above.

FIG. 10C illustrates another example of positioning light sources. As in the case of the example of FIG. 10B, a light source 1026 is included in the illumination system. In this example, the illumination system includes a forward optical assembly 1029 which, similar to backlight assembly 1028, that is configured to collect light from light source 1026 and direct the light upward. However, in this example forward optical assembly 1029 does not direct light from source 1026 through LCD array 1030 because forward optical assembly 1029 is positioned in front of (i.e. above) LCD array 1030. Here, the forward optical assembly defines the touch surface of the coordinate detection system, but it, too, could have another layer above in some embodiments. As shown by ray traces 1032, light is directed upward. Object 1034 interferes with the light and the space above the surface is imaged by camera 1010 to detect the presence of object 1034.

In some embodiments, forward optical assembly 1029 can comprise a clear optical glass infrared (IR) waveguide. Small divots or other reflective elements can be included to direct light upward, but can be selected to avoid introducing optical problems with viewing the LCD array. Additionally, LCD array can include its own backlight for illuminating the pixels of the LCD array by passing light through the array. In some embodiments, IR light can be provided via a forward optical assembly as shown in FIG. 10C in addition to IR light sources that direct light upward through the LCD array.

As another example, in addition to or instead of positioning LEDs along the edges of the display, an array of LEDs may be positioned below the top surface of the screen so that light from the array is directed upward towards the top surface through the array of pixels. Such an array of LEDs can include LEDs for illuminating the LCD array and for providing light (e.g., IR light) for use by the coordinate detection system.

In some embodiments, the camera(s) detect touch positions and other information based on the same light used to illuminate the pixels. For example, a first wavelength range (e.g., visible light) may be used to illuminate the pixels and the camera(s) can be configured to detect light in the first wavelength range. However, in some embodiments, a second wavelength range is used by the camera(s). For example, infrared (IR) detectors may be used in some embodiments to reduce or avoid interference from light of the display and/or ambient light.

In some embodiments, the illumination system includes one or more light sources to generate the first and second wavelength ranges. For example, a broadband illumination source can be used. As another example, filters may be used to obtain the desired wavelength bands. As a further example, corresponding illumination sources may be used for different wavelength bands. For example, one or more LEDs may be used to emit light in the visible wavelength bands and one or more other LEDs may be used to emit infrared light.

Figure 11A:
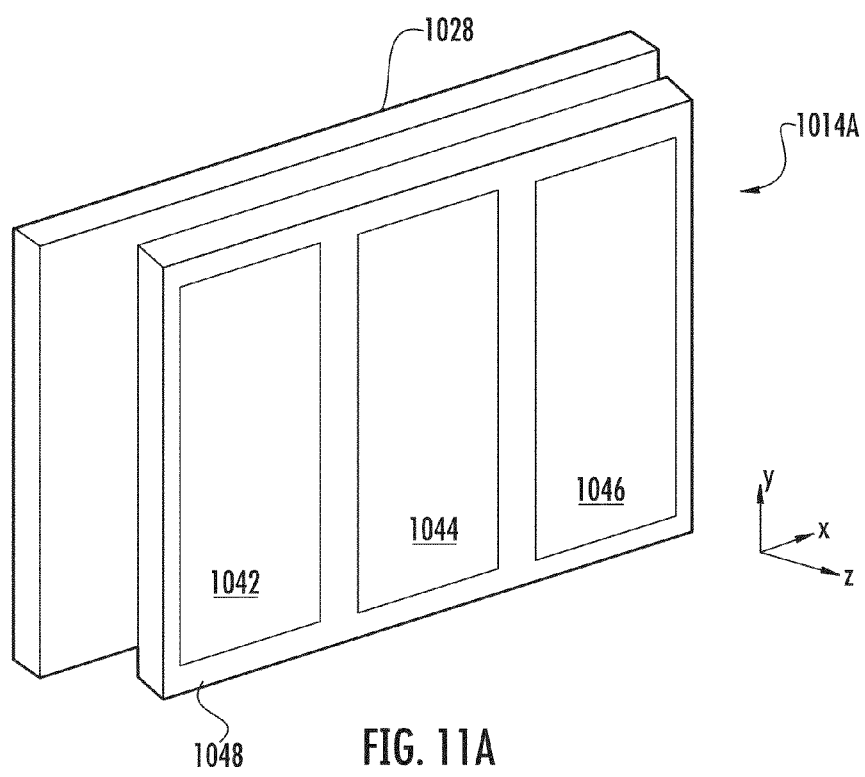
FIGS. 11A and 11B depict exemplary pixels for a touch-enabled display.
Figure 11B:
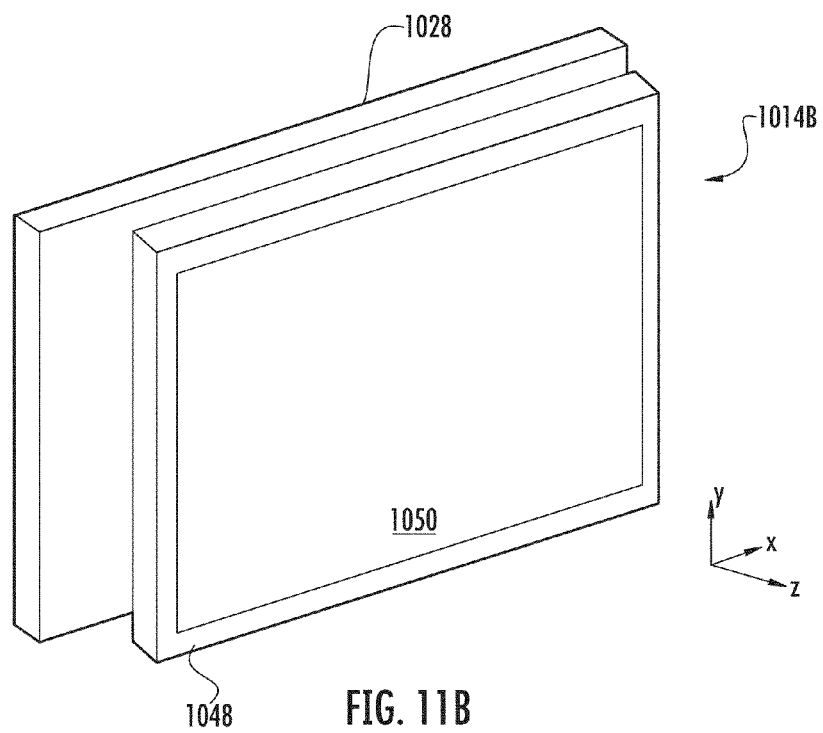

FIGS. 11A and 11B depict exemplary pixels 1014A and 1014B, respectively, suitable for use in embodiments of a touch-enabled display. In FIG. 11A, a plurality of subpixels 1042, 1044, and 1048 are shown as a matrix 1048, along with backlight assembly 1028. As is known in the art, an LCD display can utilize an array of pixels, with at least some of the pixels each comprising a plurality of sub-pixels, each of the sub-pixels having a respective color filter. For example, pixels of a color LCD display may each have a red, green, and blue sub-pixel that is controlled to achieve a desired color. For instance, to render the pixel white, each of the red, blue, and green sub-pixels can be activated to allow light from backlight assembly 1028 to pass through. If IR light is used by the camera(s) of the coordinate detection system, then the filters and other portions of the sub-pixels may be used to allow passage of the IR light through the display screen even while controlling passage of other light.

FIG. 11B illustrates an alternative pixel 1014B. In this example, a single pixel 1050 is shown; no sub-pixels are used. Instead, the light directed into backlight assembly 1028 is cycled through different wavelength ranges. For example, red, green, and blue light can be emitted via backlight assembly 1028 while pixel 1050 is gated to allow appropriate amounts of light to pass (known as "field sequential color" in the art). In accordance with the present subject matter, a portion of the sequence can include light in a wavelength range that is used by the camera(s) of the coordinate detection system. For example, if the coordinate detection system can detect infrared light, then an IR portion can be included in a red-green-blue sequence. As another example, the IR portion may overlap with one or more of the other colors As another example, pixel 1014A or 1014B may be constructed to at least partially allow passage of light in the wavelength range used by the detection system even when other light is blocked. For example, either of pixels 1014A/1014B, when implemented as an LCD pixel, can utilize a liquid crystal sandwiched between two transparent electrodes, with polarizers included opposite each electrode. The polarizers may be configured so as to allow passage of infrared light, such as by using polarizers that do not block or only partially block light of longer wavelengths.

Figure 12:
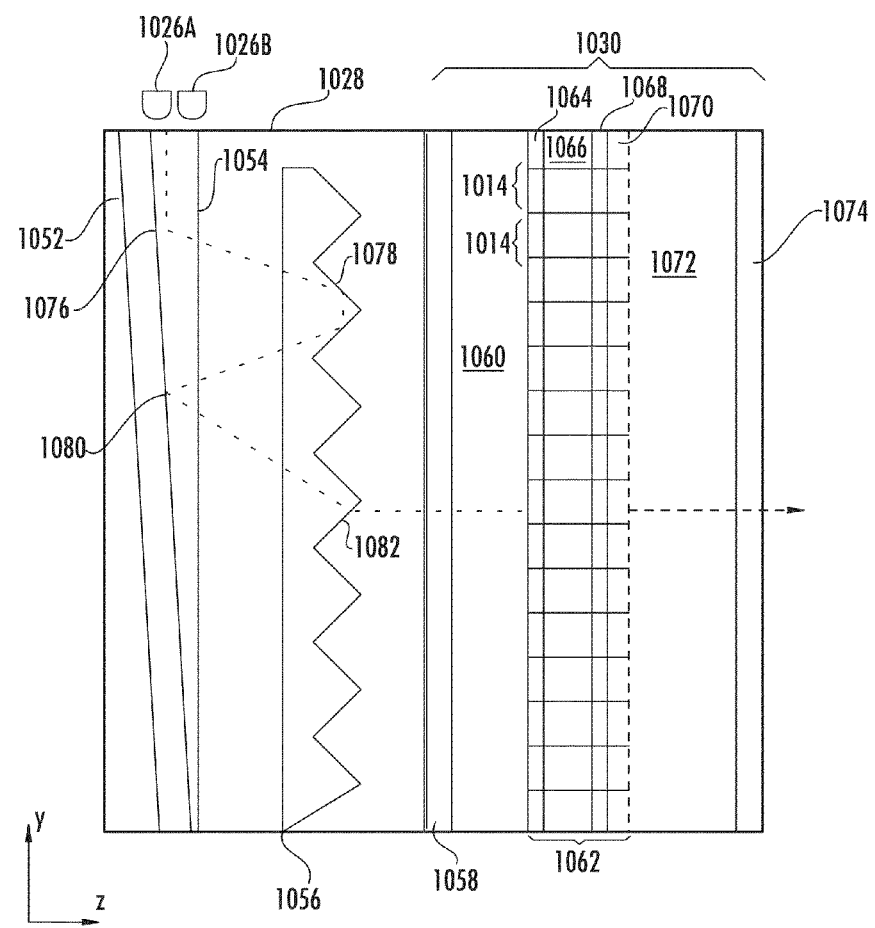
FIG. 12 illustrates a cross-sectional view of a display in a coordinate detection system.

FIG. 12 illustrates a cross-sectional view of an embodiment of display 1002 in closer detail. In this example, a backlight assembly 1028 is shown in use with two different light sources 1026A and 1026B. For example, light source 1026A may emit light in the visible spectrum while light source 1026B emits IR light. Instances of light sources 1026A/1026B may be found along one or more edges of the display area.

In this example, backlight assembly 1028 comprises a light guide 1054 positioned to collect light from sources 1026 and a reflective surface 1052 that reflects light traveling in the waveguide in a direction towards the top surface of the screen (towards the right in FIG. 12). For example, an enhanced specular reflector may be used by including a polymer film on or near waveguide 1054. Backlight assembly 1028 also includes an optical assembly 1056 which can comprise, for example, a backlight enhancement film. As shown by the ray trace illustrated as a dotted line, light from source(s) 1026 is reflected by reflector 1052 as shown at 1076. Optical assembly 1056 can be configured to selectively redirect light towards the reflective surface. For example, as shown at 1078, assembly 1056 is constructed to return light towards reflector 1052 based on the angle of incidence; this can enhance brightness by returning light to the reflector to be redirected outward at a more uniform angle. As shown at reflection 1080 and refraction 1082, this occurs in the ray trace of this example, where light exits the front of the display.

Turning to LCD array 1030, a plurality of pixels 1014 are shown. The LCD array includes a polarizer 1058 and a polarizer 1074, with polarizer 1074 corresponding to the touch surface. Between the polarizers are glass layers 1060 and 1072, although a suitable non-glass material could be used. Between the glass layers are an LCD sandwich structure 1062. Particularly, a liquid crystal material 1066 is sandwiched between transparent electrodes 1064 and 1068. As is known in the art, each pixel 1014 (or sub-pixels thereof, if used) can be addressed to energize electrodes 1064/1068 to cause liquid crystal material 1066 to selectively block passage of light. If sub-pixels are used, then filters 1070 as shown in FIG. 12 can further cause the sub-pixels to pass light having a desired wavelength range. As was mentioned above, pixels 1014 may be used to pass and/or selectively gate IR light or light in another wavelength range used by the detectors of a coordinate detection system. This can be achieved by including suitable addressing commands for gating IR light alongside the commands used to cause the pixels to display images. In embodiments in which IR light is simply passed, polarizers 1058/1074 can be configured to allow the IR light to pass through regardless of pixel status.

The principles noted above with regard to backlight assembly 1028 may be applied to an embodiment configured to use a forward optical assembly 1029 as shown in FIG. 10C, provided that appropriate adjustments are made to reduce or minimize optical effects on light exiting the LCD display.

Figure 13:
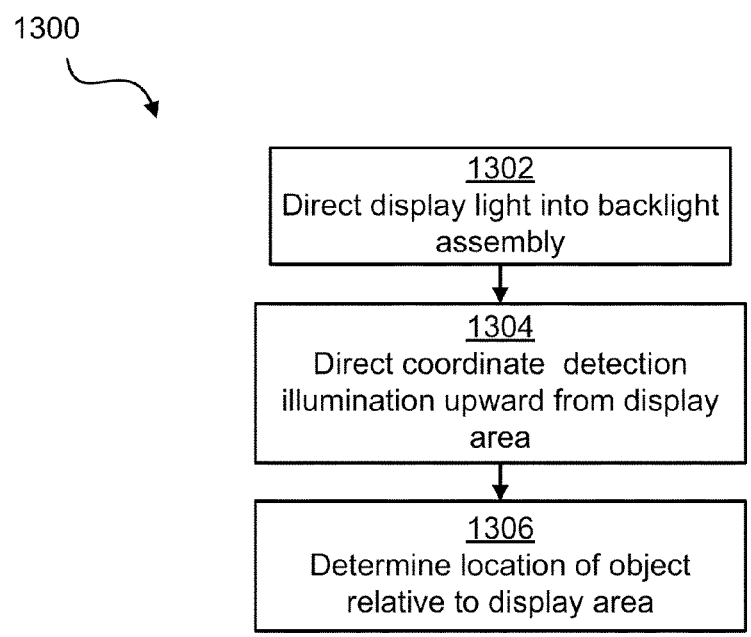
FIG. 13 is a flowchart showing exemplary steps in a method of coordinate detection.

FIG. 13 is a flowchart showing exemplary steps in a method 1300 of coordinate detection and illumination. Block 1302 represents directing display light into a backlight assembly. For example, as was noted above, light can be directed into or from a waveguide and/or other structures that direct light from sources such as LEDs upward through an array of pixels. As another example, a waveguide may not be needed, such as if an array of LEDs is positioned beneath the array of pixels. Other light sources may be sued for display illumination, such as a cold cathode tube or other source.

Block 1304 represents directing coordinate detection illumination upward from the display area and through the touch surface. For example, light can be directed into or from the backlight assembly and through the display screen. For instance, if the same wavelength ranges are used for illuminating the display and detecting presence/absence of touch, then no separate sources may be needed. However, the light used to illuminate the pixels may be in a first wavelength range (e.g., visible light) while light used for coordinate detection purposes is in a second wavelength range (e.g., IR light). Accordingly, light in the second wavelength range can be directed into or from the backlight assembly using one or more light sources.

The light sources may be the same used for the display light—for example, broadband sources may supply both the first and second wavelength ranges. As another example, one or more sources may be use for each wavelength range. For instance, one or more LEDs (e.g., white LEDs and/or red, blue, and green LEDs) may be used for visible light, with IR LEDs used for coordinate detection illumination.

The display and touch illumination light may be provided simultaneously or in sequence. For example, visible light may be supplied in a first time interval, with infrared light supplied in a second time interval. The visible light may be supplied as a red-green-blue or other sequence, with the IR light supplied after the red-green-blue sequence or in between the colors. As another example, the IR and visible light may be supplied simultaneously, with the IR/visible light gated by pixels/polarization or with no gating of the IR light.

As another example, light may be directed upward using a forward optical assembly positioned above the screen surface. For instance, LED light or light from another source (or sources) can be collected by the waveguide(s) of the assembly and then directed upward by reflection/refraction of the forward optical assembly.

Block 1306 represents determining a location of the object relative to the display area and/or the touch surface. This can be achieved, for example, by detecting a bearing for a touch point from two or more detectors based on interference with the emitted light due to an object, with the touch point corresponding to a point in the display area at which an object touches the top surface of the coordinate detection system. Depending on the configuration of the system, the top surface may, for example correspond to the top of the screen or a material above the top of the screen (e.g., a polarizer, a protective covering, a front side optical component, etc.).

As a particular example, the detectors may each comprise a line detector coupled to an optical system (e.g., one or more lenses) so that the location of a detected pattern of light corresponds to a particular bearing for the object relative to the detector. Using bearings from two detectors (along with data regarding the relative position of the detectors to the touch area) the touch point can be triangulated as is known in the art. If area detectors are used, an image of the object can be used for bearing purposes and/or to determine a position of the object relative to the top surface of the coordinate detection system.

Embodiments may also utilize a reflected image as noted above. For example, infrared light passing through the surface of the display screen may be used to detect a bearing of an object, while light in another wavelength range can be used to detect a mirror image of the object to determine a position of the object relative to the surface of the screen.

The various systems discussed herein are not limited to any particular hardware architecture or configuration. As was noted above, a computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing devices. Such system(s) may comprise one or more computing devices adapted to perform one or more embodiments of the methods disclosed herein. As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices, and the like.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art

What is claimed:

1. A coordinate detection system, comprising:
a display screen;
a touch surface corresponding the top of the display screen or a material positioned above the screen and defining a touch area;
at least one camera positioned outside the touch area and configured to capture an image of space above the touch surface;
an illumination system comprising a light source, the illumination system configured to project light from the light source through the touch surface and toward the space above the touch surface in which at least one object can be positioned, wherein the at least one camera is configured to capture the image by detecting light reflected by the at least one object in the space above the touch surface; and
a processor configured to execute program code to determine, based on the image captured by the at least one camera, whether the at least one object interferes with the light from the light source projected through the touch surface.

2. The coordinate detection system set forth in claim 1, comprising a plurality of cameras, wherein the processor is configured to determine a coordinate in the touch area based on the image from each camera based on triangulation.

3. The coordinate detection system set forth in claim 1, wherein the illumination system comprises a backlight assembly configured to direct light from the light source through an array of pixels comprising the screen.

4. The coordinate detection system set forth in claim 3,
wherein the light source is positioned at an edge of the display screen, below the top side of the screen, and configured to direct light in a direction substantially parallel to the top side of the screen, and
wherein the backlight assembly comprises a waveguide positioned to collect light from the light source and a reflective surface positioned to reflect light traveling in the waveguide in a direction towards the touch surface.

5. The coordinate detection system set forth in claim 4, wherein the backlight assembly comprises a brightness enhancement component configured to selectively redirect light toward the reflective surface.

6. The coordinate detection system set forth in claim 3,
wherein the array of pixels comprises an array of LCD pixels and the screen further comprises at least one polarizer,
wherein the at least one polarizer is configured to block light in a first wavelength range and to at least partially pass light in a second wavelength range, and
wherein the at least one camera is configured to image space above the top side of the screen by detecting light in the second wavelength range.

7. The coordinate detection system set forth in claim 6, wherein the first wavelength range comprises visible light and the second wavelength range comprises infrared (IR) light.

8. The coordinate detection system set forth in claim 6, wherein the light source comprises a plurality of light emitting diodes, including at least one diode that emits light in the first wavelength range and at least one diode that emits light in the second wavelength range.

9. The coordinate detection system set forth in claim 1,
wherein the illumination system comprises a forward optical assembly positioned in front of the screen and configured to direct light towards the top surface of the coordinate detection system.

10. The coordinate detection system set forth in claim 1,
wherein the light source comprises an array of light emitting diodes, the array including a first plurality of diodes that emit light in a visible wavelength range and a second plurality of diodes that emit light in an infrared wavelength range, and
wherein the array is positioned below the top surface of the screen.

11. The coordinate detection system set forth in claim 1, wherein the at least one camera comprises a line scan camera or an area camera.

12. A method, comprising:
projecting light from a light source through a touch surface and toward a space above the touch surface in which at least one object can be positioned, the touch surface corresponding to the top of a display screen or a material positioned above the display screen, the touch surface defining a touch area;
capturing, by at least one camera positioned outside the touch area, an image of space above the touch surface, wherein the image is captured by detecting light reflected by the at least one object in the space above the touch surface; and
using a processor, determining, based on an image captured by the at least one camera, whether the at least one object has interfered with the light from the light source.

13. The method set forth in claim 12,
wherein projecting light comprises projecting light in a first wavelength range and a second wavelength range,
wherein the at least one camera is configured to detect light in the second wavelength range.

14. The method set forth in claim 13, wherein the light in the first wavelength range is projected using a first light source and the light in the second wavelength range is projected using a second light source.

15. The method set forth in claim 12, wherein the method further comprises selectively blocking light in a wavelength range detectable by the at least one camera.

16. The method set forth in claim 12, further comprising:
determining a location of the at least one object relative to the touch area or the touch surface.

17. The method set forth in claim 12, wherein the at least one camera is configured to detect infrared light and wherein projecting light comprises projecting infrared light and non-infrared light.

18. The method set forth in claim 12, wherein the at least one camera comprises at least one of a line scan camera or an area camera.

19. The method set forth in claim 12, wherein projecting light comprises directing light from a source positioned below the top surface of the screen into an optical assembly that redirects the light through the screen.

* * * * *